(12) United States Patent
Xi et al.

(10) Patent No.: US 12,346,277 B2
(45) Date of Patent: *Jul. 1, 2025

(54) SYSTEMS AND METHODS FOR HARDWARE ACCELERATION OF DATA MASKING

(71) Applicant: Microsoft Technology Licensing, LLC, Redmond, WA (US)

(72) Inventors: Jinwen Xi, Sunnyvale, CA (US); Ming Gang Liu, Kirkland, WA (US); Eric S. Chung, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,959

(22) Filed: Feb. 12, 2024

(65) Prior Publication Data

US 2024/0296133 A1   Sep. 5, 2024

Related U.S. Application Data

(63) Continuation of application No. 17/559,233, filed on Dec. 22, 2021, now Pat. No. 11,934,327.

(51) Int. Cl.
*G06F 13/36* (2006.01)
(52) U.S. Cl.
CPC .......... *G06F 13/36* (2013.01); *G06F 2213/40* (2013.01)

(58) Field of Classification Search
CPC ...... G06F 13/36; G06F 13/38; G06F 13/4009; G06F 13/4013; G06F 13/4018; G06F 2213/40; G06F 2216/01
See application file for complete search history.

(56) References Cited

U.S. PATENT DOCUMENTS

| | | | | |
|---|---|---|---|---|
| 8,332,473 | B1* | 12/2012 | Fouts | H04L 67/565 709/206 |
| 8,407,707 | B2* | 3/2013 | Sonnier | H04L 49/506 718/100 |
| 11,646,987 | B1* | 5/2023 | Pathak | H04L 51/212 709/206 |
| 11,934,327 | B2* | 3/2024 | Xi | G09C 1/00 |
| 2019/0097800 | A1* | 3/2019 | Melrose | H04L 9/0825 |

* cited by examiner

*Primary Examiner* — Raymond N Phan

(57) ABSTRACT

A field programmable gate array (FPGA) including a configurable interconnect fabric connecting a plurality of logic blocks, the configurable interconnect fabric and the logic blocks being configured to implement a data masking circuit configured to: receive input data including data values at a plurality of indices of the input data; select between a data value of the data values and an alternative value using a masking multiplexer to generate masked data, the masking multiplexer being controlled by a mask value of a plurality of mask values at indices corresponding to the indices of the input data; and output the masked data. In some examples, the configurable interconnect fabric and the logic blocks are further configured to implement a mask generation circuit configured to generate the mask values. In some examples, the mask values are received from external memory.

19 Claims, 16 Drawing Sheets

SYSTEMS AND METHODS FOR HARDWARE ACCELERATION OF DATA MASKING

CROSS-REFERENCE TO RELATED APPLICATIONS

This application is a continuation of U.S. patent application Ser. No. 17/559,233 filed on Dec. 22, 2021, entitled "Systems and Methods for Hardware Acceleration of Data Masking Using a Field Programmable Gate Array," which is incorporated herein by reference in its entirety.

BACKGROUND

A field programmable gate array (FPGA) is a hardware device that includes an array of logic blocks and reconfigurable interconnects between those logic blocks. In Intel® (or, formerly, Altera®) products, these logic blocks may be referred to as Adaptive Logic Modules (ALMs) and in Xilinx® products, these may be referred to as Configurable Logic Blocks (CLBs). Each logic block may include programmable logic, such as one or more look up tables (LUTs) for performing configurable logical mappings from inputs to outputs, an adder for adding input values, a register for temporarily holding data, and the like. Programming or configuring an FPGA with a configuration file sets the interconnects (or interconnect "fabric") to wire together the different logic blocks, thereby configuring the FPGA to perform the particular function specified by the configuration file (sometimes referred to as a "bit file").

Compared to software implementations executed by a general purpose processor, an FPGA brings the benefits of higher performance and lower power consumption of implementing computations at a low level (e.g., at a circuit level). This is similar to the benefits of using an application specific integrated circuit (ASIC) such as specialized co-processors such as a graphics processing unit (GPU) or neural accelerator, which are used to accelerate operations specific to computer graphics and artificial neural networks, respectively. However, the design and fabrication of ASICs is a long, expensive process with high upfront fixed costs.

Accordingly, some applications of FPGAs include, for example, prototyping for hardware design that may eventually be implemented in an ASIC as well as hardware acceleration of computations in circumstances where designing and fabricating an ASIC may not be justified (e.g., due to low quantities or high specialization of the computations). In addition, FPGAs also provide flexibility of reconfiguration of the underlying hardware (in the "field") without being locked into a fixed hardware configuration, as in the case of an ASIC, where the logic is directly implemented in the layout of a circuit at the time of fabrication and therefore has little to no reconfigurability. Some cloud computing providers provide access to hardware instances (e.g., servers) that include connected FPGAs, thereby allowing users to customize the FPGA to perform hardware acceleration of computational operations.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of the present technology relates to the hardware acceleration of data masking, which is a commonly-performed operation in the field of machine learning. As one example, autoregressive transformer models, which are frequently applied in machine learning models for natural language processing, apply masks to input data in order to ensure that the transformer model learns to make predictions for a given token in a sequence of tokens based only on tokens appearing earlier in the sequence and not based on tokens appearing later in the sequence. A mask is applied to the data to enforce this autoregressive constraint by hiding (e.g., zeroing out) values that should not be considered during the training process.

The hardware acceleration of data masking according to various aspects of the present technology therefore improves the performance of machine learning model training processes that include data masking operations. The improvements in performance relate to reductions in computing time (e.g., processor time), reductions in data storage and bandwidth (e.g., memory usage and data transferred over communications buses), energy consumption, and, in some examples, reduces the amount of physical hardware used in certain implementations on field programmable gate arrays (FPGAs).

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

Figure 1:
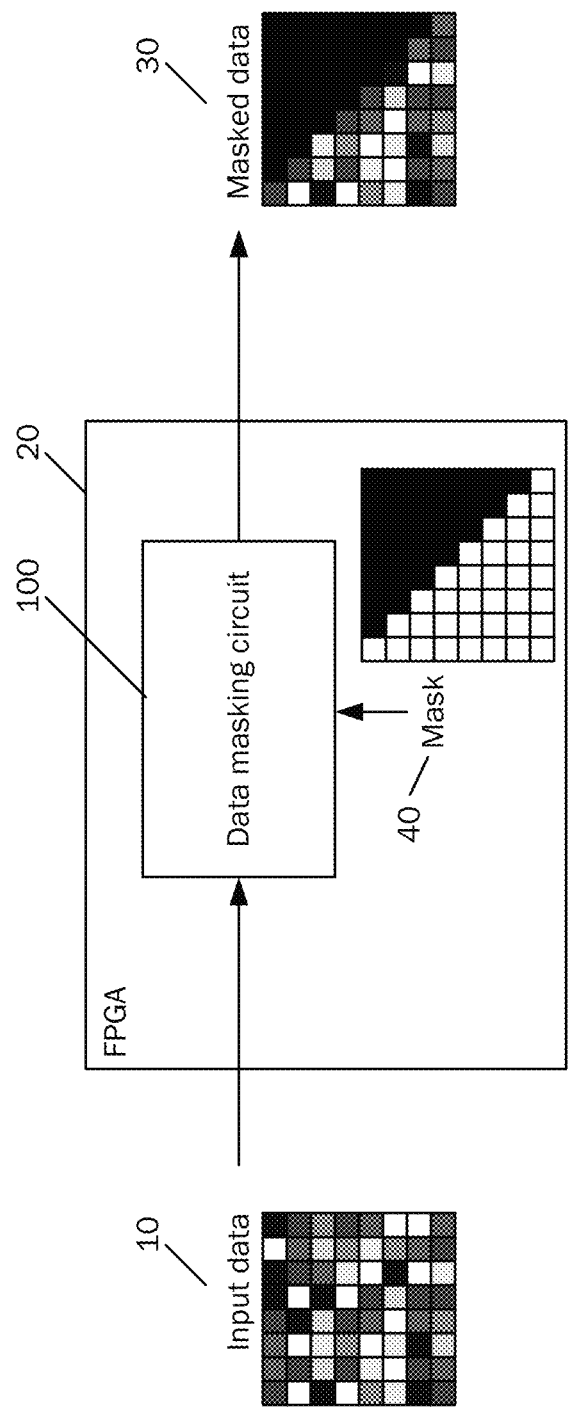
FIG. 1 depicts a high level diagram of masking input data by a data masking circuit implemented by a field programmable gate array (FPGA) to generate masked data according to one example.

The following detailed description refers to the accompanying drawings. Wherever possible, the same reference numbers are used in the drawing and the following description to refer to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

The present technology relates to systems and methods for accelerating the masking of data using hardware such as a field programmable gate array (FPGA). One use case for FPGAs is the acceleration of computations that are associated with machine leaning tasks such as computer vision (e.g., image classification, instance segmentation, and the like), natural language processing (e.g., transformer models), and the like. Training a machine learning model, such as a deep neural network (DNN), may take hours of computing time for a small model and may take weeks or months of computing time for large models. Moving computationally expensive operations from programs running on relatively slow, general purpose processors (e.g., CPUs) or shaders running on graphics processing units (GPUs) onto FPGAs specifically configured to perform those expensive mathematical operations can provide significant reductions in total compute time and reductions in power consumption.

When training some types of machine learning models, masks are used to hide or remove some values during the training process. FIG. 1 depicts a high level diagram of masking input data 10 by a data masking circuit 100 implemented by a field programmable gate array (FPGA) 20 to generate masked data 30 according to one example. In particular, the data masking circuit 100 may apply a mask 40 to the input data to hide or remove or replace values in the input data 10 with other values, such as a constant value or values from another data source. In machine learning models, masking is used in order to improve the performance of the resulting trained models, such as by ensuring that the models do not learn to make predictions based on future data For example, transformer models have been widely adopted in natural language processing (NLP) applications such as machine translation, question answering, and the like. A large portion of transformer models are autoregressive, meaning that a token at position [i] cannot be computed based on information from tokens at positions [i+1] or onward. All layers in a transformer model operate along the hidden dimension (and can ignore this constraint) except for the self-attention heads, which operate along the sequence dimension. To enforce the autoregressive constraint, a mask is used to mask out tokens at positions greater than or equal to [i+1]. FIG. 1 depicts an example of an attention score matrix supplied as the input data 10, where the rows are labeled in increasing index from top to bottom (e.g., index i from 0 to 7) and from left to right (e.g., index j from 0 to 7). The mask 40 is shown in FIG. 1 as an upper triangular mask to mask out the upper right triangle of the attention score matrix to produce the masked data 30, corresponding to the locations of where positions j are greater than or equal to [i+1].

Figure 2:
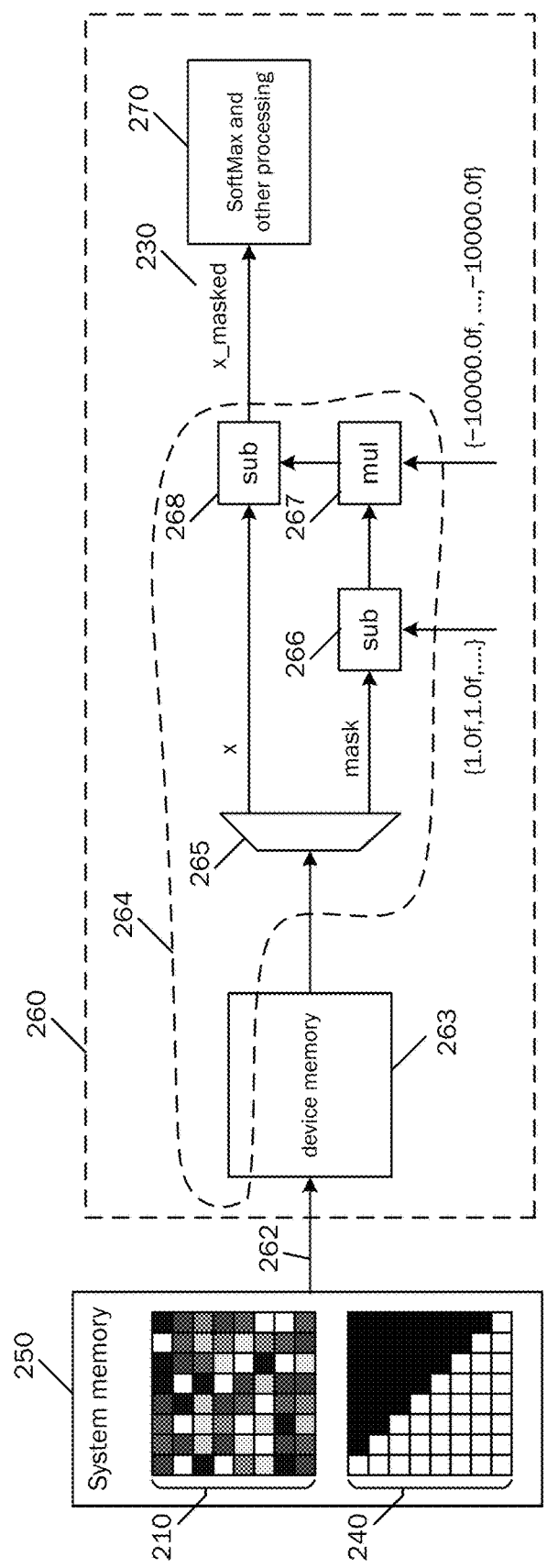
FIG. 2 depicts an example comparative system configured to mask data.

For a transformer model with a maximum sequence length of L, the attention mask has dimensions L×L, corresponding to $L^2$ elements of the storage overhead. FIG. 2 depicts an example comparative system configured to mask data. As shown in FIG. 2, the input data 210 and the data representing the attention mask 240 are stored in memory 250, such as the main memory of a computing device or on-chip or on-accelerator memory (e.g., the memory of a GPU of a computing device or a cache in a system-on-chip device). The training example input data 210 and the attention mask 240 are supplied to a vector processor/accelerator 260 over a communications bus 262 (e.g., Peripheral Component Interconnect Express (PCIe) or other interconnection bus) and may be stored in device memory 263 (e.g., in registers of the vector processor/accelerator 260) to perform a computation to mask the training example input data 210 and generate corresponding masked training example input data (x_masked) 230. In particular, in some comparative systems, attention mask storage and logic 264 is used to compute the masked training example input data (x_masked) 230 in accordance with the following:

$$\text{x\_masked}(i, j) = x(i, j) - 10000.0 \cdot [1.0 - \text{mask}(i, j)], \quad (1)$$

where mask $(i, j) \in \{0.0, 1.0\}$

In more detail, in the system shown in FIG. 2, a demultiplexer (DEMUX) 265 is used to route training example input data 210 and attention mask 240 along different data paths, where a first floating point subtraction circuit 266, a floating point multiplier 267, and a second floating point subtraction circuit 268 are used to implement Equation (1). While the attention mask storage and logic 264 is shown in FIG. 2 as a set of discrete functional blocks, such comparative accelerators 260 may also be implemented using, for example, software code (e.g., programs or shaders) controlling the operations of a vector processor or a graphics processing unit. As a result, the original value of the training example input data 210 is preserved at locations (i,j) where the mask data at (i,j) was 1.0 f, and the original data is replaced with the value x−10,000 at locations (i,j) where the mask data at (i,j) was 0.0 f.

In the comparative system shown in FIG. 2, the masked training example input data (x_masked) 230 is supplied to a circuit implementing a SoftMax function and other processing 270. A SoftMax function σ is typically computed on an i-th value $z_i$ of an input vector z of values in accordance with:

$$\sigma(z_i) = \frac{e^{z_i}}{\sum_{j=1}^{K} e^{z_j}}$$

As seen above, the numerator of the SoftMax function is $e^{z_i}$. Therefore, the value of the SoftMax approaches 0 as the input value $z_i$ approaches −∞. In practice, supplying a sufficiently large negative number (a negative number having a large absolute value) as input to the SoftMax function σ will produce a number that is small enough to be rounded to zero, or to be effectively zero for the purposes of the algorithm to be accelerated (e.g., the training of a machine learning model). In the above example shown in FIG. 2 and Equation (1), it is assumed that the values are represented in a low-precision floating point format such as BFloat16, IEEE half-precision 16-bit float FP16, or the like. The masked vector x_masked will go through the SoftMax layer 270 so that those masked out locations that are fully attenuated by the masking operation yield a zero value after the SoftMax. Because the magnitude of x does not exceed 1,000 from all current transformer models, a constant alternative value of −10,000 was chosen because, $e^{x-10000}$ will be rounded to zero in most low-precision floating-point formats. In some examples, machine learning models make use of training example data values (or activations of internal layers to be masked) that fall within different ranges. For example, if the magnitude of x is does not exceed 100,000, a constant value applied during masking may be, for example, −200,000 or −1,000,000.

The example system shown in FIG. 2 illustrates some limitations exhibited by comparative accelerators configured to apply a mask to input data. These limitations include: memory storage overhead, memory bandwidth overhead, and arithmetic overhead.

Regarding memory storage overhead, the mask has the same dimensions as the input training example data and is typically specified using the same data type as the input training example data. For example, if the input training example data is an L×L matrix of 16 bit floating point values (e.g., BFLoat16 or FP16), then the input training example data and the mask each has a size of 16 $L^2$ bits (or, equivalently, 2 $L^2$ bytes), for a total of 32 $L^2$ bits or 4 $L^2$ bytes that must be stored in the device memory 263. For example, a typical sequence length of 2048 tokens requires 8 megabytes (MB) memory space to store the mask in 16-bit floating-point precision (e.g., in BFloat 16 or FP16 floating-point data formats). When the accelerator is implemented using a vector processor/accelerator with limited on-chip memory, 8 MB of mask data buffer is a substantial overhead and greatly increases the cost of manufacturing the underlying chip or FPGA hardware in the case of FPGA-based designs, or may require dedicating additional logic blocks of the FPGA to implementing a larger memory (instead of additional compute or other purposes), thereby decreasing throughput and/or increasing power consumption.

Regarding memory bandwidth overhead, as seen in FIG. 2, the attention mask 240 stored in the memory is fetched or transmitted from the system memory 250 to the vector processor/accelerator 260 over a communications bus 262, and consumes as much bandwidth as fetching the training example input data 210. Training a large machine learning model (such as a transformer) typically involves multiple processors/accelerators 260 fetching data from multiple memory banks of the system memory 250 simultaneously or concurrently over a shared communications bus 262, and therefore benefits from efficient usage of the memory bandwidth. However, in the arrangement shown in FIG. 2, fetching the attention mask 240 over this shared communications bus 262 imposes an additional 1× memory bandwidth and may become a system performance bottleneck.

Regarding arithmetic overhead, in the system shown in FIG. 2, each attention mask operation performed in accordance with Equation (1) requires one floating point multiplication and two floating point subtractions, which consume a significant portion of the floating-point computing resources of a vector processor and/or a significant number of logic blocks of an FPGA.

These three limitations of accelerator designs that exhibit one or more of the above characteristics provide opportunities for increased energy efficiency, storage efficiency, bandwidth efficiency, and computation speed in accordance with various examples of the present technology, which enables attention mask generation with a small memory footprint and a mask operations with fewer float-point operations. Such improvements enable examples of the present technology to provide cost-effective solutions for training large machine learning models, such as state-of-the-art autoregressive transformer models.

Aspects of examples of the present technology relate to systems and methods for accelerating training processes of machine learning models including processes including the masking of data. Some aspects of examples relate to applying a mask (e.g., an attention mask in the case of an autoregressive transformer model) by using a multiplexer and without performing any floating-point arithmetic. Some aspects of embodiments relate to a circuit further configured to generate commonly-used masks on-device, thereby avoiding the use of storage resources and communications bandwidth to transfer a mask to the accelerator over a communications bus. Some further aspects of embodiments relate to a hybrid circuit configurable to generate and apply a mask on-device or to apply a mask received from system memory over the communications bus (e.g., for less frequently used or specialized masks). Combining the above techniques of applying a mask to data (or masking data) without floating-point arithmetic and generating masks on-device reduces the memory overhead (e.g., storage and bandwidth) associated with the masks and reduces computational overhead without losing the flexibility to support different or arbitrary masks for specialized purposes that cannot be generated on-chip or that would be inefficient to generate on-chip.

Figure 3A:
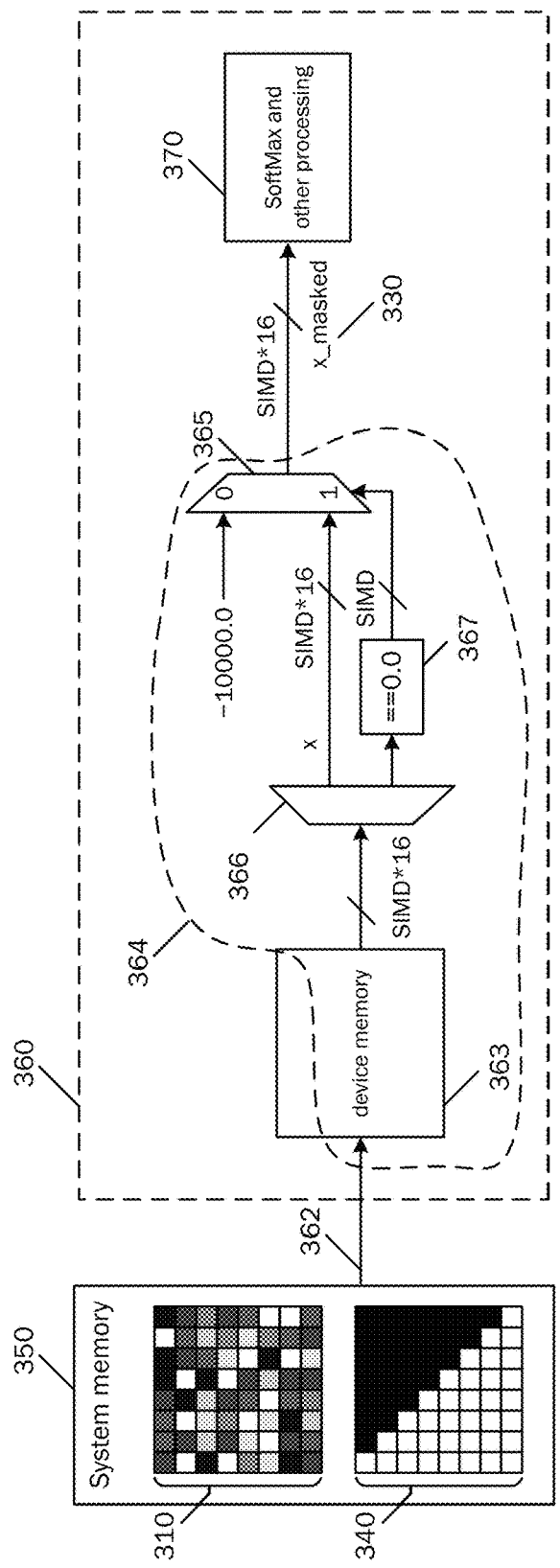
FIG. 3A is a block diagram of an accelerator including a data masking circuit configured to receive mask data according to one example.
Figure 3B:
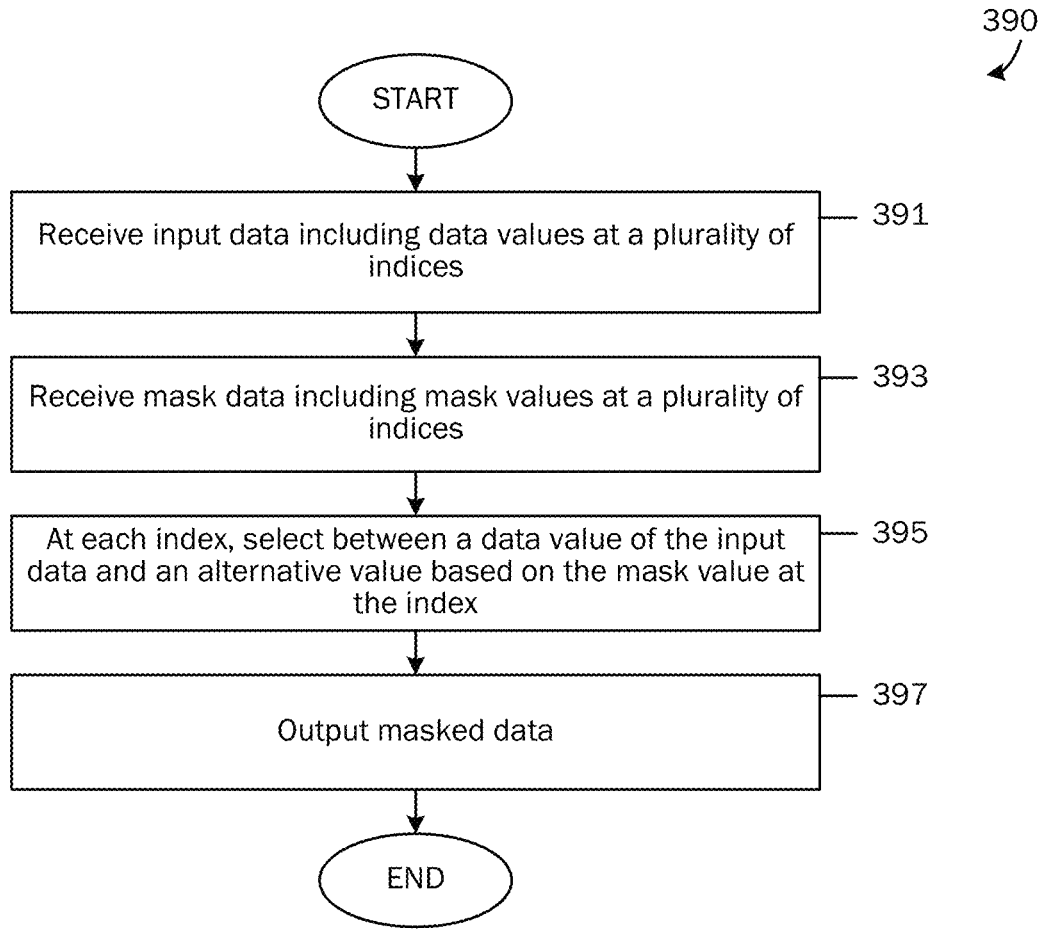
FIG. 3B is a flowchart of a method for masking data using a data masking circuit and received mask data according to one example.

FIG. 3A is a block diagram of an accelerator including a data masking circuit configured to receive mask data according to one example. FIG. 3B is a flowchart of a method 390 for masking data using a data masking circuit and received mask data according to one example. As shown in FIG. 3A, training example input data 310 and mask data 340 are stored in system memory 350, which are provided to an accelerator 360 via a communications bus 362 and stored in device memory 363 of the accelerator 360 (e.g., block memory or BRAM in the case of an FPGA implementation of an accelerator). Accordingly, in some examples, in operation 391, the accelerator receives input data including data values at a plurality of indices. In the example shown in FIG. 3A, the input data is arranged in a two-dimensional array (or matrix) of data values, where each data value is located at a two-dimensional index (e.g., a row and a column coordinate pair) of the matrix. While FIG. 3A shows a two-dimensional array, embodiments of the present technology are not limited thereto, and include circumstances where the input data values are arranged in a one-dimensional array (or vector) of data values, in which case the index of each data value is a single value, as well as circumstances where the input data values are arranged into an n-dimensional array (or tensor) where n is greater than 2, where the index of each value may be expressed as an n-dimensional coordinate tuple.

In operation 393, the accelerator also receives mask data including mask values at a plurality of indices, where the indices of the mask values correspond to the indices of the input data received in operation 391.

An attention mask storage and generation logic or data masking circuit 364 is configured to compute masked data 330 based on the training example input data 310 and the mask data 340 by applying the mask data 340 to the training example input data 310. In more detail, in the example shown in FIG. 3A, a demultiplexer 366 separates training example input data 310 from the mask data 340 and directs the data along different data paths. The data values (labeled x) are supplied to one of the inputs of a masking multiplexer 365, and the mask data 340 is used to control the masking multiplexer 365. The other input of the masking multiplexer 365 is supplied with an alternative value, shown in FIG. 3A as −10,000.0, although embodiments of the present disclosure are not limited thereto.

In the arrangement shown in FIG. 3, a comparator 367 is also included between the mask output of the demultiplexer 366 and the control input of the masking multiplexer 365. This comparator is used to convert the mask data 340 from its internal format (e.g., a floating-point representation) into a binary representation (e.g., a corresponding 0 or 1 value) in order to control the masking multiplexer 365.

In operation 395, the accelerator 360 selects between the data value (x) of the input data 310 and an alternative value (−10000.0) to generate masked data 330, which is output in operation 397 (e.g., to other portions of the accelerator 360 such as SoftMax and other processing 370 as shown in FIG. 3A). As discussed above, an alternative value of −10000.0 is provided as an example in FIG. 3A merely as an example of a large negative number that is used such computing the SoftMax σ of these large negative numbers results is a value that is close to 0 or that is rounded to 0, thereby hiding or removing or masking such data values. However, examples of the present technology are not limited thereto. As noted above, the value of −10000.0 is chosen in this example based on an assumption that the data values x are no larger in magnitude than 1000.0, and therefore the alternative value that is applied to mask the data depends on the range of the data values x to be masked. For example, if the data values x are no larger in magnitude than 10,000, then the alternative value applied in the mask may be −100,000. As another example, the alternative value may be a different value, such as a fixed value of 0.0, such as in cases where the mask is applied after the SoftMax function or where the mask is applied to activations between other layers of a neural network architecture that are not immediately followed by a SoftMax function or other exponential function (e.g., when masking activations of a neural network layer to implement a dropout layer for training with dropout regularization).

In the embodiment shown in FIG. 3A, the accelerator 360 implements a vector processor configured to perform single-instruction-multiple-data vector operations on data where the same operation is performed on the multiple values in a vector in parallel. In FIG. 3A, the accelerator performs these parallel operations by a factor of SIMD (e.g., on vectors of length SIMD, where SIMD is a value such as 8 or, typically, another value that is a power of 2). As such, various data paths are labeled "SIMD" indicating that these data paths are SIMD lanes wide or "SIMD*16" indicating that these data paths are "SIMD*16" bits wide (e.g., SIMD 16-bit lanes in the case of a vector of SIMD 16-bit values). As a specific example, the masking multiplexer 365 shown in FIG. 3A is a SIMD-wide multiplexer is supplied with a SIMD*16 input (x) and controlled by a SIMD-wide signal representing the masks. Accordingly, the masking multiplexer 365 outputs a vector of SIMD 16-bit values selected in parallel from the corresponding data values x or the alternative value (−10000.0) based on the SIMD-wide mask values. To process the full training example input data 310, the accelerator 360 divides the training example input data 310 into SIMD-sized chunks and supplies the chunks to the data masking circuit 364 one SIMD-sized chunk at a time.

As such, some aspects of the present technology relate to accelerating the masking of input data based on a mask without the use of floating-point arithmetic, such as two floating-point subtractions and a floating-point multiplication (see, e.g., FIG. 2) and, instead, performing masking using a multiplexer to select between a data value and an alternative value based on the mask data.

Figure 4A:
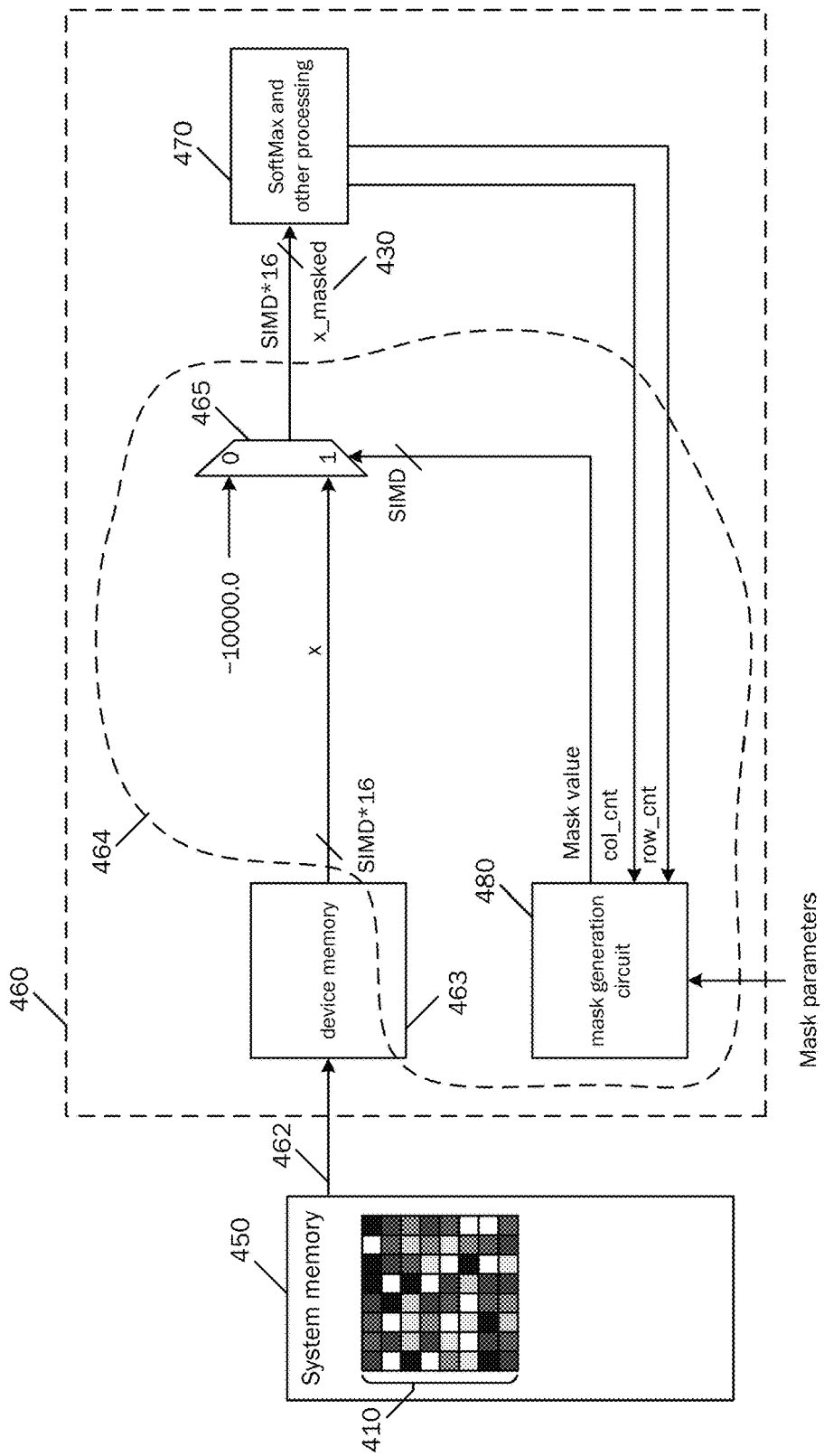
FIG. 4A is a block diagram of an accelerator including a data masking circuit configured to generate mask data according to one example.

FIG. 4A is a block diagram of an accelerator including a data masking circuit configured to generate mask data according to one example. As shown in FIG. 4A, training example input data 410 is stored in system memory 450, which is in communication with an accelerator 460 according to one example. The training example input data 410 is transmitted to the accelerator 460, where it may be stored, for example, in device memory 463 of the accelerator 460 (e.g., block memory or BRAM in the case of an accelerator 460 implemented in an FPGA). In contrast to the arrangements shown in FIG. 2 and FIG. 3, the accelerator 460 does not fetch mask data over the communications bus 462 from the system memory 450 (which may not store mask data). Instead, the accelerator 460 according to some examples includes a mask generation circuit 480 configured to generate a mask that is applied to the received input data 410.

Figure 4B:
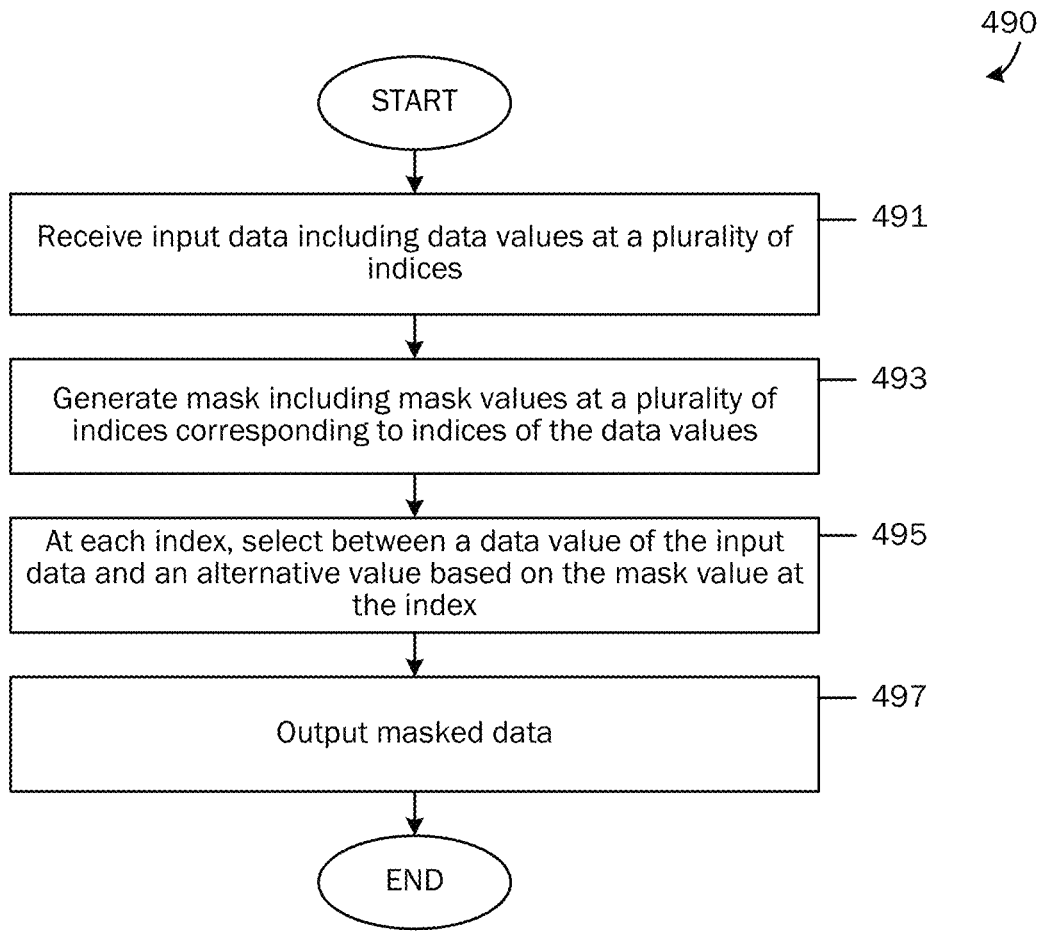
FIG. 4B is a flowchart of a method for masking data using a data masking circuit and generated mask data according to one example.

FIG. 4B is a flowchart of a method for masking data using a data masking circuit and generated mask data according to one example. In operation 491, the accelerator 460 receives input data including data values at a plurality of indices. As noted above with respect to FIG. 3A, in the example shown in FIG. 4A, the input data is arranged in a two-dimensional array (or matrix) of data values, where each data value is located at a two-dimensional index (e.g., a row and a column coordinate pair) of the matrix, but the present technology is not limited thereto, and include circumstances where the input data values are arranged in other n-dimensional arrays where n is greater than 0 and indexed by an n-dimensional index.

At operation 493, the accelerator 460 generates a mask for the input data, where the mask includes mask values at a plurality of indices corresponding to indices of the data values. In the embodiment shown in FIG. 4A, a mask generation circuit 480 generates mask values based on indices (shown as column counter col_cnt and row counter row_cnt) received from another circuit component (shown in FIG. 4A as the SoftMax and other processing 470). In more detail, the mask generation circuit 480 generates a binary value for each index or position within the mask, where the binary value is 0 or 1 (e.g., where 1 indicates that the original data should appear in the masked data and where 0 indicates that the original data should be removed or masked-out).

In some examples, the mask generation circuit 480 is configured to generate masks based on repeating or repetitive patterns that can be expressed using a closed form equation or formula. One such example, as noted above, is a triangular mask that is typically used in transformer models.

$$\text{mask}(i, j) = \begin{cases} 1.0, & \text{when } i \leq j \\ 0.0, & \text{when } i > j \end{cases} \quad (2)$$

$$\text{mask}(i, j) = \begin{cases} 1.0, & \text{when } i > j \\ 0.0, & \text{when } i \leq j \end{cases} \quad (3)$$

where i is a column index and j is a row index, where Equation (2) specifies an upper triangular mask that masks out elements in the upper right part of an input data matrix and selects elements in a lower left triangular part of the input data matrix, and where Equation (3) specifies a lower triangular mask that masks out elements in the lower left part of an input data matrix and selects elements in the upper right triangular part of the input data matrix.

Accordingly, the mask generation circuit 480 automatically generates mask values (e.g., 0 and 1) based on the given index (e.g., (i, j) coordinate pairs) in accordance with a formula encoded in the mask generation circuit 480 (e.g., Equation (2) or Equation (3)). While the upper triangular mask and lower triangular mask of Equations (2) and (3) provide two examples of masks, examples of the present technology are not limited thereto and also include other types of masks in other shapes, such as alternating patterns (e.g., based on a parity of an index value), rectangular regions which may be fixed or defined based on additional parameters provided to the mask generation circuit 480 (e.g., coordinate pairs identifying corners of a rectangular region), and the like. Examples of circuits implementing a mask generation circuit 480 in accordance with the present technology will be described in more detail below.

At operation 495, at each index, the accelerator 460 selects between a data value from the original input data and an alternative value based on the mask value at that index of the mask. As shown in FIG. 4A, the mask value output from the mask generation circuit is supplied to a masking multiplexer or masking mux 465, where the masking mux 465 is used to select between input data received from the device memory 463 and an alternative value, where an example of an alternative value is shown in FIG. 4A as −10,000.0. As discussed above, an alternative value of −10000.0 is provided as an example in FIG. 4A merely as an example of a large negative number that is used such computing the SoftMax σ of these large negative numbers results is a value that is close to 0 or that is rounded to 0, thereby hiding or removing or masking such data values. However, examples of the present technology are not limited thereto and other alternative values may be selected for output instead of the input data values in accordance with the mask data.

At operation 497, the data masking circuit 464 of the accelerator 460 outputs the masked data 430 as produced by the selecting of a mask in operation 495. The masked data 430 is then output, e.g., for further processing by other portions of the accelerator 460, such as circuits for SoftMax and other processing 470.

In a manner similar to that described above with respect to FIG. 3A, the data masking circuit 464 shown in FIG. 4A is illustrated as a vector processor configured to process the input data 410 in chunks of SIMD values (e.g., SIMD 16-bit values for a data path of SIMD*16 bits), where the mask generation circuit 480 is configured to generate the mask in chunks that are SIMD bits wide.

Using memory to store all the elements of a regular or repeating pattern binary mask has significant spatial redundancy because there are only two possible values to be stored: {0.0, 1.0}, but each mask value may be represented using far more than a single bit (e.g., each value may be represented in a 16-bit floating-point value data format such as BFloat16 or FP16). Therefore, instead of storing the mask pattern in the off-chip memory (e.g., system memory 250 of FIG. 2) and fetching to the on-chip memory (e.g., device memory 263 of FIG. 2) during the masking process, some aspects of examples of the present technology, as described above with respect to FIG. 4A and FIG. 4B, uses logic within the accelerator 460 (e.g., the FPGA soft logic) to construct a mask generation circuit 480 to create the mask on-the-fly.

Figure 4C:
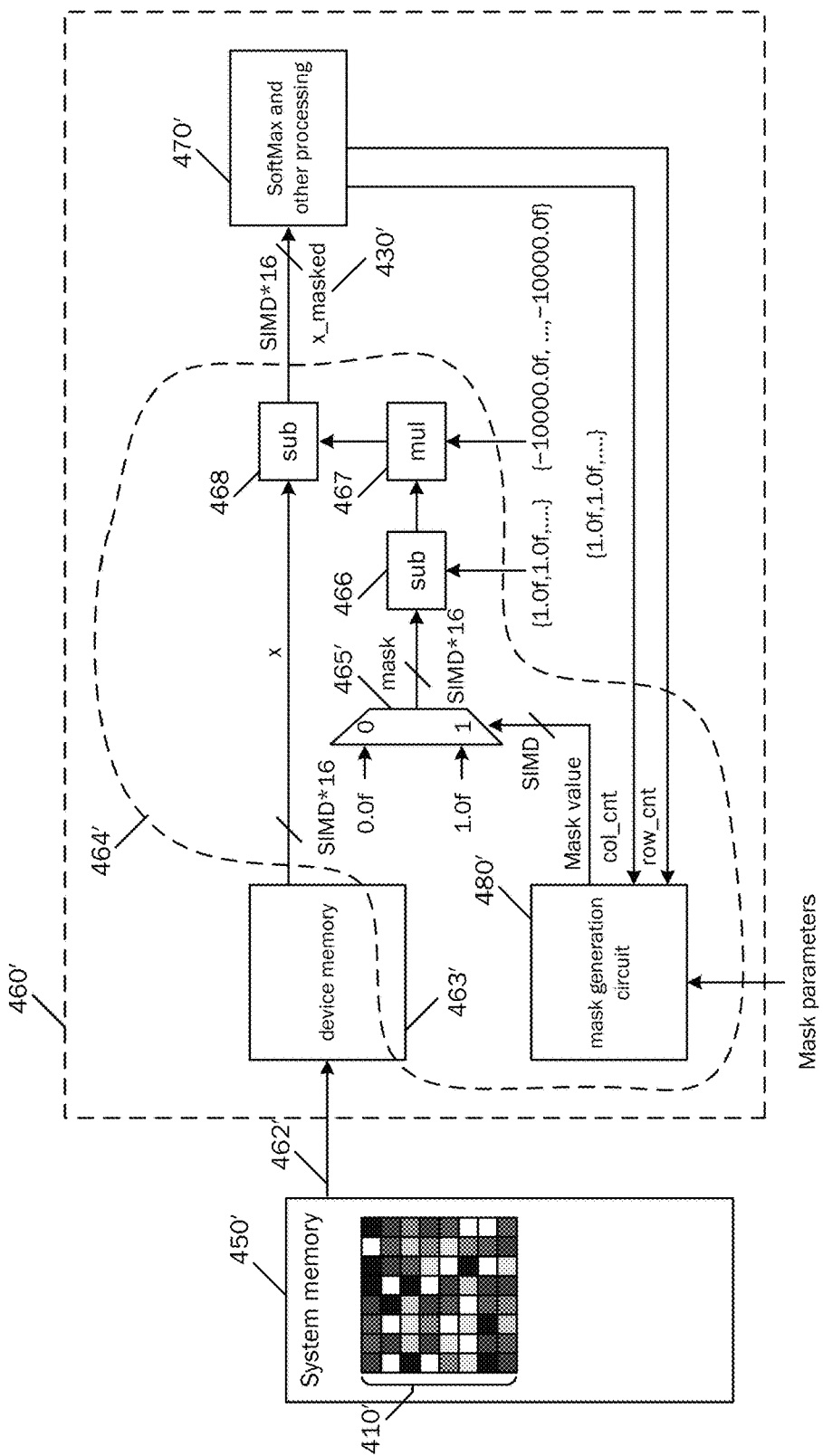
FIG. 4C is a block diagram of an accelerator including a data masking circuit configured to generate mask data according to one example.

FIG. 4C is a block diagram of an accelerator 460' including a data masking circuit 464' configured to generate mask data according to one example. The block diagram shown in FIG. 4C is substantially similar to the block diagram shown in FIG. 4A, where training example input data 410' is stored in system memory 450', which is in communication with an accelerator 460' over a communications bus 462'. The input training example data 410' is transmitted to the accelerator 460', where it may be stored, for example, in device memory 463 of the accelerator 460. Similar to the accelerator 460 of FIG. 4A, the accelerator 460' according to some examples includes a mask generation circuit 480' configured to generate a mask that is applied to the received input data 410'.

In contrast to the block diagram shown in FIG. 4A, the mask generation circuit 480' outputs a mask value (e.g., a SIMD-length bit vector) controlling a masking multiplexer 465' to selectively output floating point values of 0.0 f or 1.0 f, such that the format of the mask generated by the combination of the mask generation circuit 480' and the masking multiplexer 465' is similar to the data format of the floating-point attention mask 240 shown in FIG. 2. The floating point values of the mask are supplied along a data path (e.g., SIMD*16 wide data path in the case of a 16-bit float-point representations of the mask value) to a first adder 466 configured to subtract the mask value from a constant value of 1.0 f and to multiply the resulting values by a constant large negative value (shown in FIG. 4C as −10000.0 f), then supply the value to a second adder 468 to subtract the value from the data x in a manner implementing the formula of Equation (1).

As such, the arrangement shown in FIG. 4C depicts the use of an on-chip or on-accelerator mask generation circuit 480 to generate a mask, thereby avoiding bandwidth and storage consumption associated with storing a mask and transmitting the mask over a communications bus 462', while applying the internally-generated mask to input training example data x in a manner similar to the comparative technique (e.g., using a floating-point multiplier and floating-point adders).

The data masking circuit 464 and the data masking circuit 464' described above with respect to FIG. 4A and FIG. 4C are therefore examples of circuits configured to apply masks that are internally-generated by the mask generation circuit 480 to data received from an external source.

Some examples of the present technology relate to a data masking circuit configurable, based on additional inputs, to selectively generate a mask internally using a mask generation circuit (an "internal mask"), apply an externally-supplied mask received over the communications bus (an "external mask"), or apply no mask to the data. This enables some examples of the present technology to maintain the flexibility to apply masks that may have irregular patterns that are not supported by the mask generation circuit or that would be inefficient for the mask generation circuit to generate internally (e.g., because a corresponding closed form equation representing the mask is complex).

Figure 5A:
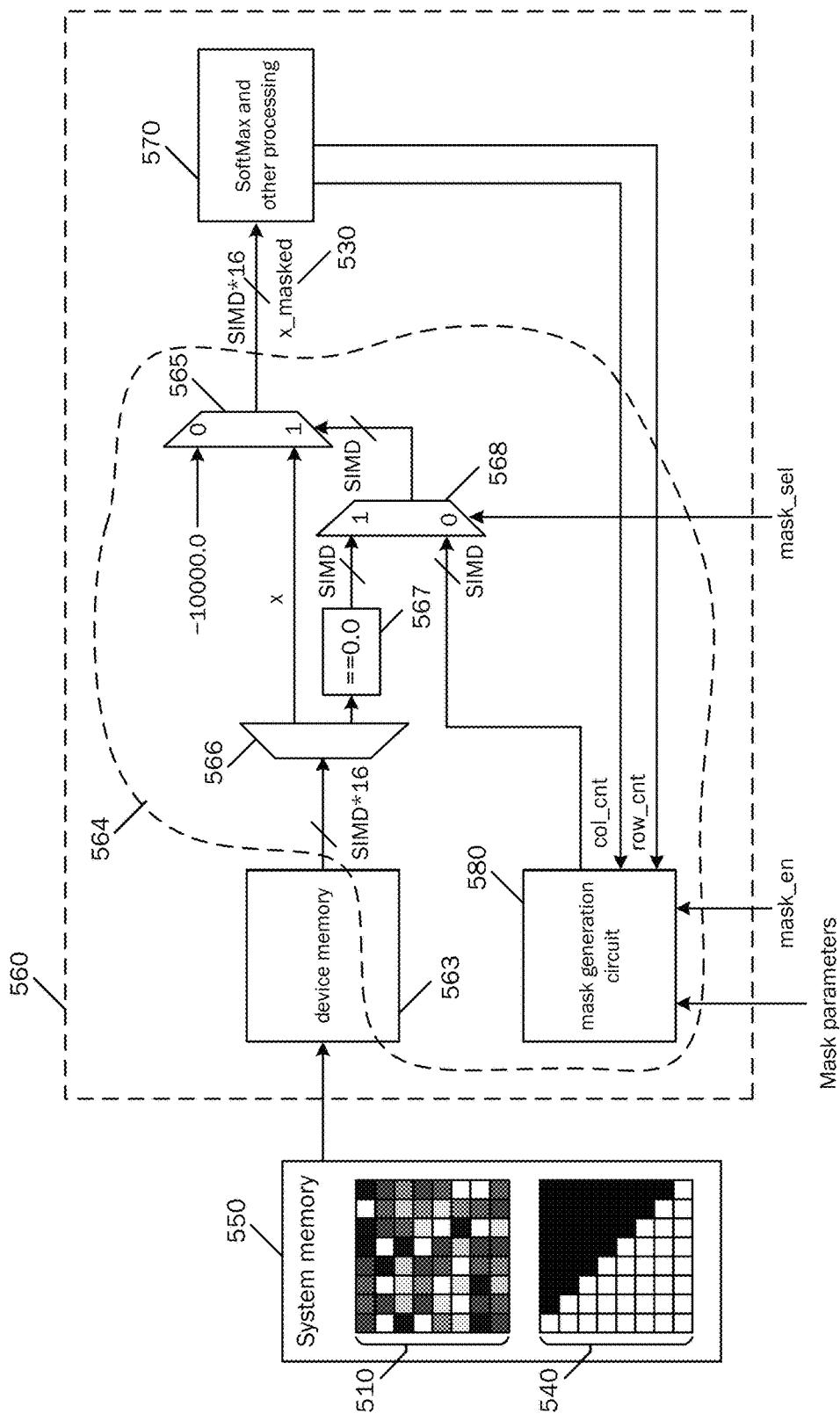
FIG. 5A is a block diagram of an accelerator including a hybrid data masking circuit configured to selectively mask data based on generated mask data or based on received mask data according to one example.

FIG. 5A is a block diagram of an accelerator including a hybrid data masking circuit configured to selectively mask data based on generated mask data or based on received mask data according to one example. In more detail, FIG. 5A provides an example of a hybrid masking architecture for an accelerator 560 that includes both a data path for applying memory-based external masks (e.g., received over a communications bus from an external source) and a data path for applying internally-generated masks (e.g., generated by a mask generation circuit within the accelerator). In more detail, the data masking circuit 564 according to one example shown in FIG. 5A is substantially similar to, and combines components from, the data masking circuit 364 of FIG. 3A configured to mask data based on an external mask 340 received from system memory 350 and the data masking circuit 464 of FIG. 4A configured to mask data based on an internal mask generated by a mask generation circuit 480 of the data masking circuit 464.

Figure 5B:
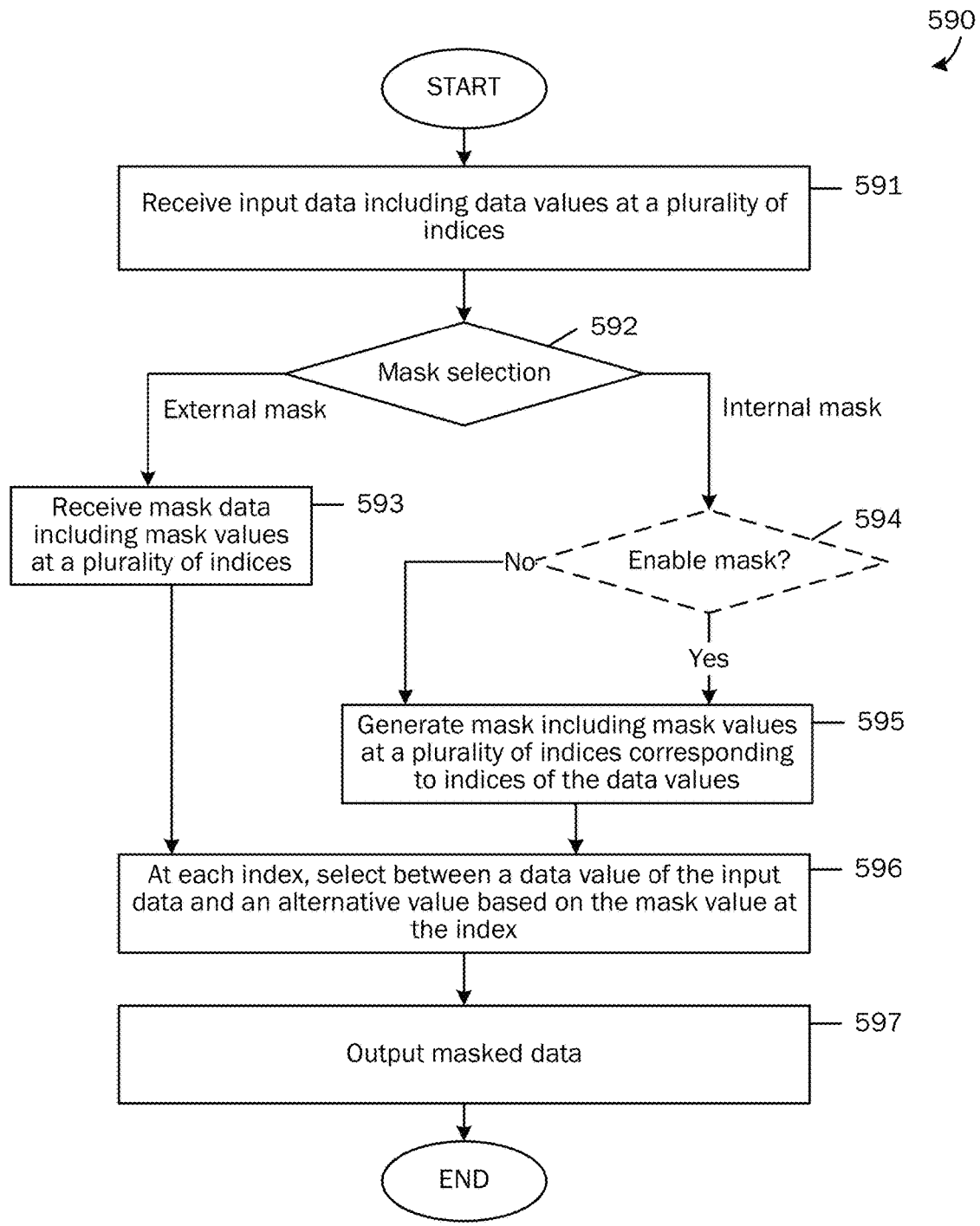
FIG. 5B is a flowchart of a method for masking data using a hybrid data masking circuit configured to selectively mask data based on generated mask data or based on received mask data according to one example.

FIG. 5B is a flowchart of a method 590 for masking data using a hybrid data masking circuit configured to selectively mask data based on generated mask data or based on received mask data according to one example. In operation 591, the accelerator 560 receives input data including data values at a plurality of indices. As noted above with respect to FIG. 3A and FIG. 4A, in the example shown in FIG. 5A, the input data is arranged in a two-dimensional array (or matrix) of data values, where each data value is located at a two-dimensional index (e.g., a row and a column coordinate pair) of the matrix, but the present technology is not limited thereto, and include circumstances where the input data values are arranged in other n-dimensional arrays where n is greater than 0 and indexed by an n-dimensional index.

In some examples, a mask selection multiplexer (mux) 568 controlled by a 1-bit mask selection input ("mask_sel") is used to select whether the mask is to be supplied from the memory (e.g., system memory 550 or device memory 563) or the on-chip mask generation circuit 580. Accordingly, as shown in FIG. 5B, in operation 592, the data masking circuit 564 selects a data path from which the data masking circuit 564 will apply a mask, selecting between a data path corresponding to an external mask 540 received from system memory 550 and a data path corresponding to a mask generated within the accelerator 560.

In more detail, a data path for applying an external mask 540 from system memory 550 includes a portion of the device memory 563 storing the external mask 540 received from the system memory in operation 593, a demultiplexer 566 configured to separate the input training example data 510 from the external mask data 540 and an optional comparator 567 configured to convert mask data from floating-point representations of mask values to binary values (e.g., single bit values). The resulting binary mask is then supplied as one of the inputs to the mask selection multiplexer 568.

In the example shown in FIG. 5A, a data path for applying a generated mask includes a mask generation circuit 580. In some examples, a 1-bit mask enable input ("mask_en") is provided as a mask parameter is used to select, in operation 594, whether a mask is applied to the data at all, such as by controlling the mask generation circuit 580 to generate, in operation 595, a mask that causes all of the input data to flow through to the output (thereby performing the identity function on, or applying the identity mask to, the input data), versus applying a mask generated in accordance with a particular pattern (e.g., an upper triangular mask, a lower triangular mask, a block upper triangular mask, a block lower triangular mask, an alternating mask, or the like), where the mask generation circuit 580 is configured to generate a particular mask based on additional inputs to the select between the different possible masks.

In more detail, in manner similar to that described above with respect to the mask generation circuit 480 of FIG. 4A and FIG. 4B, the mask generation circuit 580 receives an index indicating a portion of the mask to generate (e.g., column counter col_cnt and row counter row_cnt, received from a SoftMax and other processing circuit 570), and generates a mask according to the pattern of the mask that the mask generation circuit 580 is configured to generate (e.g., based on a selection from a collection of pre-programmed masks) and outputs the mask values to the mask selection multiplexer 568.

As shown in FIG. 5A, the output of the mask selection multiplexer 568 corresponding to the mask selected by the mask selection input (mask_sel) is supplied to a masking multiplexer 565 which is configured to select between the input data (x) and an alternative value (shown in FIG. 5A as −10000.0) in operation 596 to generate the masked data (x_masked) 530 representing the input data masked in accordance with the selected mask. The data masking circuit 564 outputs the masked data 530 in operation 597, e.g., for further processing by other portions of the accelerator 560, such as circuits for SoftMax and other processing circuit 570.

Figure 6A:
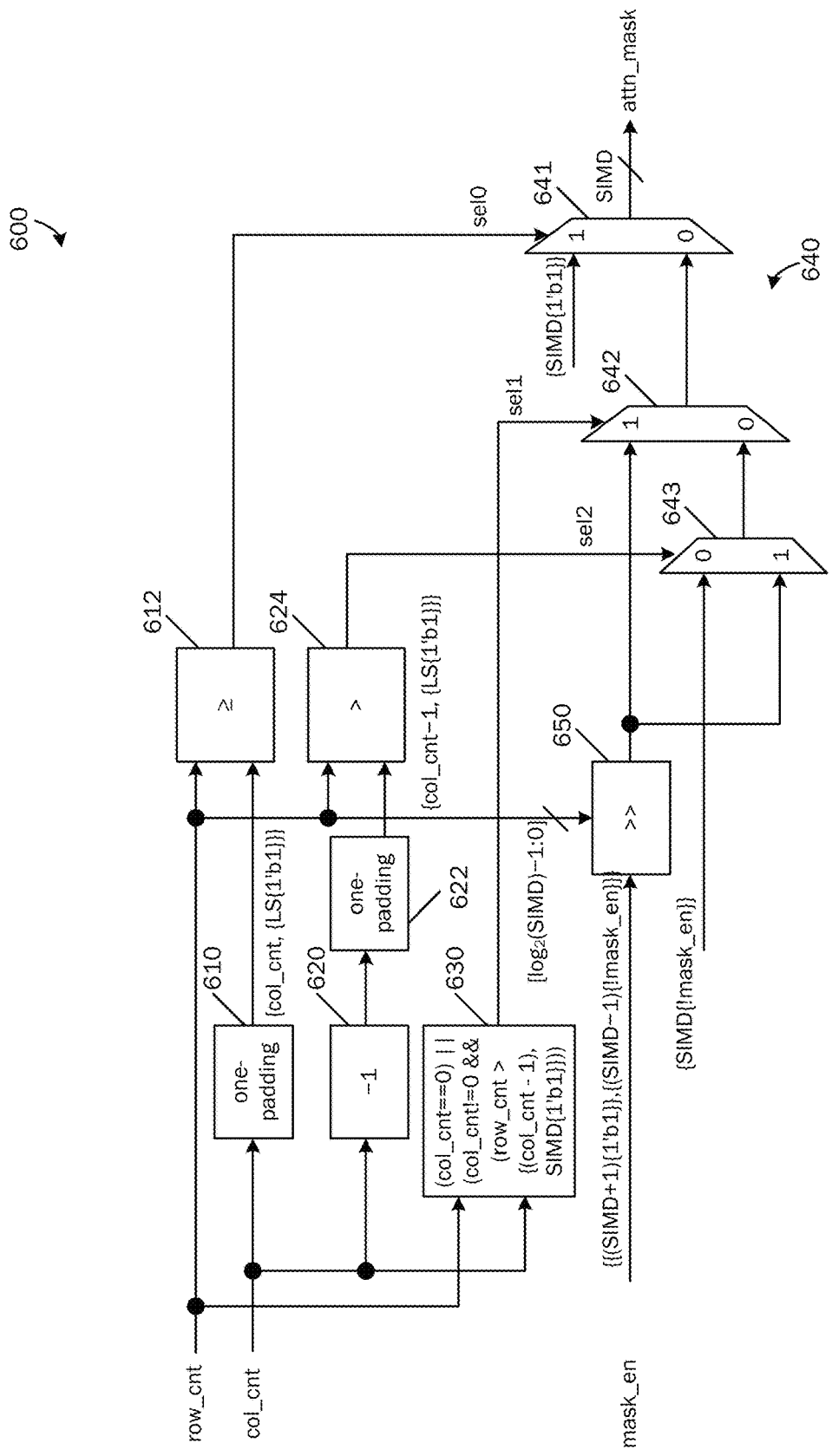
FIG. 6A is a block diagram of a mask generation circuit configured to generate a triangular mask according to one example.

FIG. 6A is a block diagram of a mask generation circuit 600 configured to generate an upper triangular mask according to one example, such as the mask defined in accordance with Equation (2). This example of a mask generation circuit may be applied, for example, as a component of the mask generation circuit 580 shown in FIG. 5A. The mask generation circuit 600 shown in FIG. 6A takes three inputs: "mask_en" being a mask enable signal as a control register signal received from outside (e.g., from a software program managing the use of the accelerator in accelerating the training of a machine learning model), and a row counter "row_cnt" and a column counter "col_cnt" that are two counter values that may be received from a circuit following the data masking circuit, such as the SoftMax and other processing circuit 570 shown in FIG. 5A. As another example, if a vector processor is used to perform a SoftMax, the counters may be supplied by register file values when running the firmware.

In the example shown in FIG. 6A, the mask generation circuit is configured to generate mask values in SIMD-sized chunks for an accelerator configured to perform operations across multiple values in parallel in SIMD-sized chunks. For example, considering the arrangement shown in FIG. 5A, where the input training example data 510 is arranged in a two-dimensional array (a matrix) and where the corresponding mask has the structure of a two-dimensional matrix with the same dimensions as the input training example data 510, the two-dimensional array may be processed on a row-by-row basis, where each row of the two-dimensional array is divided into SIMD-sized chunks (also assuming that the number of values in each row is an integer multiple of the SIMD data width of the accelerator or is padded to a next integer multiple of SIMD larger than the column dimension of the two-dimensional array).

The column counter "col_cnt" specifies the current location of the fetched data vector along the tensor row on which the SoftMax operation will be applied on the masked data. Because each row of the data is processed separately and is broken into SIMD-sized chunks, in the case where the input data is square (e.g., where the input data has dimensions L×L), the row counter "row_cnt" counts from 0 to L−1 and the column counter "col_cnt" counts from 0 to (L/SIMD)−1. Accordingly, the row counter "row_cnt" has log2(SIMD) more bits than "col_cnt."

Figure 6B:
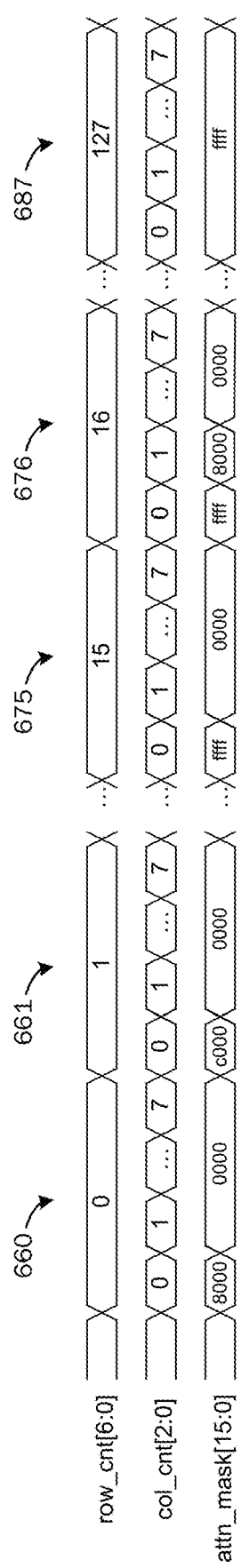
FIG. 6B is a timing diagram illustrating inputs and outputs of a mask generation circuit configured to generate a triangular mask according to one example.

FIG. 6B is a timing diagram illustrating inputs and outputs of a mask generation circuit configured to generate a triangular mask according to one example. In the example shown in FIG. 6B, the input tensor has dimensions 128×128 and the SIMD width is 16 values. As a result, the row counter row_cnt counts from 0 to 127, which requires 7 bits ($2^7$=128), as identified in the label row_cnt[6:0]. On the other hand, the column counter col_cnt counts from 0 to L/SIMD−1=128/16−1=7, which requires 3 bits ($2^3$=8), as identified in the label col_cnt[2:0]. Therefore, row_cnt requires $\log_2$(SIMD)=$\log_2$(16)=4 more bits than col_cnt. The mask generation circuit is configured to generate the mask in chunks of SIMD values. Because SIMD is 16 in this example, the attention mask is generated in chunks of 16 bits (one bit for each position in the chunk of the mask being generated, as identified by the label attn_mask[15:0].

As noted above, the example mask generation circuit 600 is configured to generate an upper triangular mask, and therefore these possibilities include: a chunk of SIMD 1s {SIMD{1'b1}}, a chunk of SIMD 0s {SIMD{1'b0}}, or some number of 1s followed by some number of 0s. As seen in the example mask 40 shown in FIG. 1, an upper triangular mask has values of 1 in the lower left triangle (shown as white squares) and values of 0 in the upper right portion of the triangle (shown as shaded squares).

As shown in FIG. 6B, when the row counter is 0 at reference 660, then only the first mask value has a value of 1 and the remaining mask value s in row 0 have a value of 0. As such, for the first SIMD sized chunk of values (where SIMD is 16) is the bit string 1'b1000000000000000 which is equal to 8000 in hexadecimal, as shown in the corresponding value of attn_mask of FIG. 6B. The remaining seven chunks of the first row are all zeroes at col_cnt 1 through 7. Likewise, when considering row 1 of an upper triangular mask, the first two mask values have a value of 1 and the remaining mask values have a value of 0. Therefore, when row_cnt is 1 at reference 661, the first SIMD sized chunk of values is the bit string 1'b1100000000000000 which is equal to c000 in hexadecimal, as shown in the corresponding value of attn_mask of FIG. 6B., and the remaining seven chunks of the first row are all zeroes at col_cnt 1 through 7.

FIG. 6B further provides an example when row_cnt is 15 at reference 675 and when row_cnt is 16 at reference 676. In particular, in row 15, the first sixteen values of the row are 1s, and therefore the full first chunk of 16 values are 1s, which is equal to ffff in hexadecimal and the remaining seven chunks of the first row are all zeroes at col_cnt 1 through 7, as shown in the corresponding value of attn_mask of FIG. 6B . . . . In row 16, the first seventeen mask values are 1s, so the first chunk at col_cnt 0 are all 1s (ffff), and the first value at col_cnt 1 is 1, followed by fifteen 0s, which is equal to 8000 in hexadecimal. The remaining chunks of the row at col_cnt 2 through 7 are all 0s, as shown in the corresponding values of the attn_mask in FIG. 6B.

As another example, the last low of the upper triangular mask, generated at reference 687 of FIG. 6B is all 1s (see, e.g., the mask 40 of FIG. 1), and therefore the attn_mask is ffff during all chunks in the row (e.g., for col_cnt 0 through 7).

Therefore, each generated SIMD-sized chunk of the mask may be: all 1s when the SIMD-sized chunk is entirely within the lower left triangle of 1s; all 0s when the SIMD-sized chunk is entirely in the upper right triangle of 0s; or some number of 1s followed by the remaining number of 0s in the case where the chunk is across the boundary between the lower left triangle of 1s and the upper right triangle of 0s.

As shown in FIG. 6A, the final attention mask output att_mask is a SIMD-bit vector corresponding to one of the three possibilities, selected by the muxes 640 based on the combination of the select signals {sel0, sel1, sel2}. In particular, first select signal sel0 is asserted when the output of the chunk is all 1s, third select signal sel2 is asserted when the output is all 0s, and second select signal sel1 is asserted when the output is across the diagonal boundary between the lower left triangle of 1s and the upper right triangle of 0s (e.g., a sequence of 1s followed by 0s).

Figure 6C:
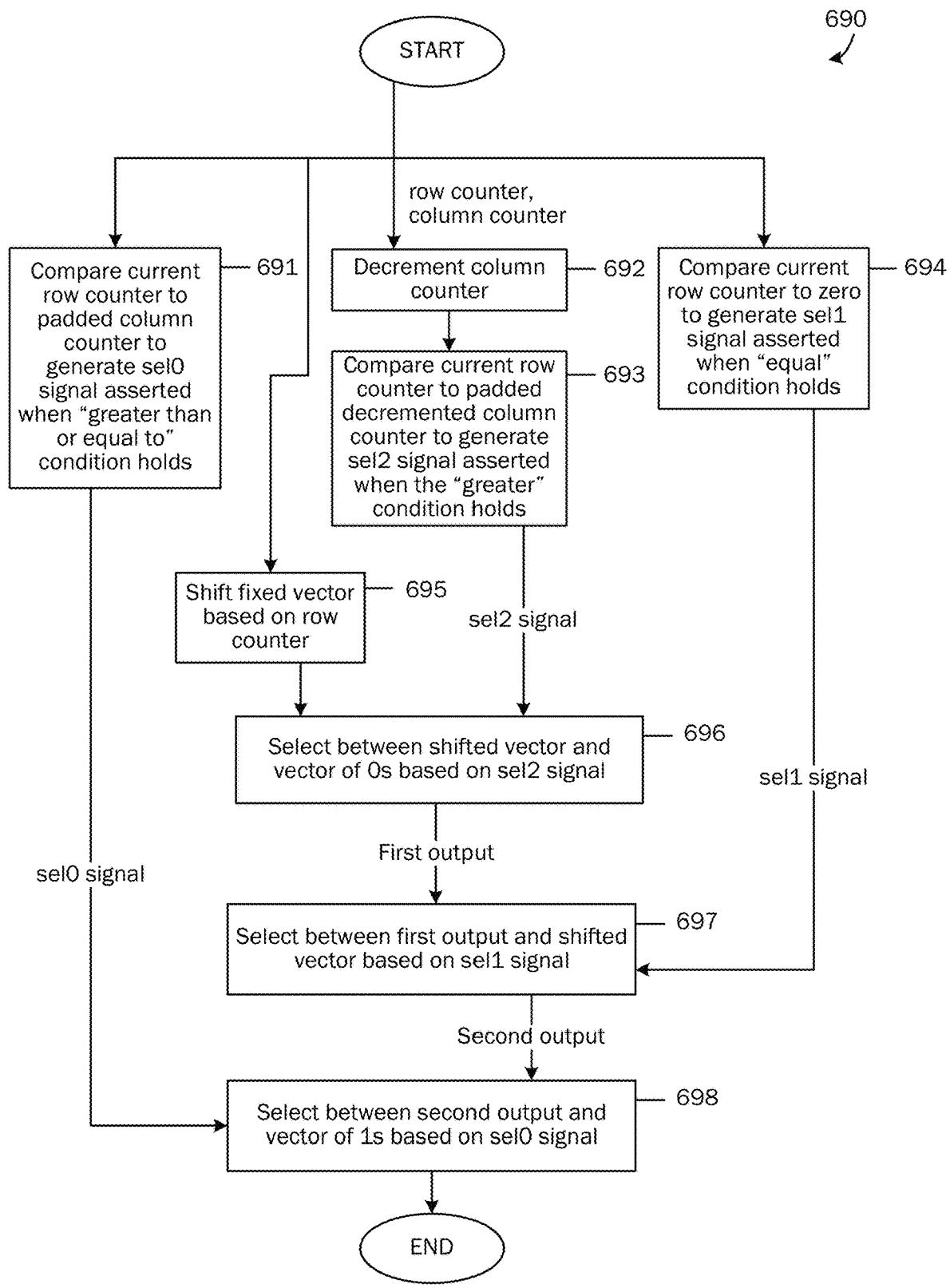
FIG. 6C is a flowchart of a method for generating a triangular mask based on an index according to one example.

FIG. 6C is a flowchart of a method 690 for generating a triangular mask based on an index according to one example. In operation 691, the mask generation circuit 600 compares the current "row_cnt" value with "col_cnt" padded with $\log_2$(SIMD) 1s (by a first one-padding circuit 610) using a less-than-or-equal-to comparator 612 to generate the first select signal "sel0" signal that is asserted when padded col_cnt≤row_cnt condition holds. The mask generation circuit 600 also includes a decrement circuit 620 configured to generate a decremented-by-1 version of "col_cnt" in operation 692, which is padded with $\log_2$(SIMD) 1s (by a second one-padding circuit 622) and the padded decremented column counter is compared to "row_cnt" in operation 693 by a greater than comparator 624 which generates the third select signal "sel2" signal that is asserted when col_cnt−1>row_cnt condition holds. In operation 694, the mask generation circuit 600 compares "col_cnt" with zero using an equality comparator 630 to generate the second select signal "sel1" signal that is asserted when "equal" condition holds where (col_cnt==0)∥(col_cnt !=0) && (row_cnt>{(col_cnt−1), SIMD{1'b1}}), indicating that the current chunk of the mask crosses the boundary between the 1s and the 0s.

The select signals sel0, sel1, and sel2 are supplied to muxes 640 including first mux 641, second mux 642, and third mux 643 to control the outputs to the case of all 1s, a mix of 1s and 0s, and all 0s, respectively.

The example of the mask generation circuit 600 shown in FIG. 6A generates the mix of 1s and 0s based on the row counter, as described in more detail below. In operation 695, the mask generation circuit 600 shifts a 2*SIMD long vector of SIMD+1 1s and SIMD−1 0s or {{(SIMD+1){1'b1}}, {(SIMD−1){1'b0}}} (e.g., 1'b11111111111111111000000000000000 when SIMD is 16) using the shifter 650, where the SIMD LSBs of the shifted output are supplied to the second mux 642 corresponding to the case where sel1 is 1'b1. The shifter 650 shifts the fixed vector by a shifting amount that is computed by taking the $\log_2(\text{SIMD})$-bit least significant bits (LSBs) of the row_cnt.

In operation 696, the mask generation circuit uses the third mux 643 to select between the shifted vector output by the shifter 650 and a vector of 0s to generate a first output, where the selection is made based on the third select signal sel2. In operation 697, the mask generation circuit uses the second mux 642 to select between the first output and the shifted vector output by the shifter 650 to generate a second output, where the selection is made based on the second select signal sel1. In operation 698, the mask generation circuit uses the first mux 641 to select between the second output and a vector of 1s ({SIMD{1'b1}}) based on the first select signal sel0 to generate the output mask (attn_mask).

As noted above, in some examples, a control input "mask_en" is used to enable or disable the mask. When the mask is enabled (e.g., when mask_en is 1), then a triangular mask is output (e.g., with 1s in the lower left triangle and 0s in the upper right triangle), and when the mask is disabled (e.g., when mask_en is 0), then the entire mask may be output as having the value of 1, such that the original data passes through the data masking circuit without modification (e.g., without masking the data).

Accordingly, in the example shown in FIG. 6A, the control input "mask_en" is used to generate the 2*SIMD-bit constant vector with 1s padded at the most significant bits (MSBs) {{(SIMD+1){1'b1}},{(SIMD−1){!mask_en}}}. In the example shown in FIG. 6B where SIMD is 16, this vector is 1'b11111111111111110000000000000000 when mask_en is 1 (when the mask is enabled) and a vector of 32 1s {32{1'b1}} when mask_en is 0.

Likewise, the input to the third mux 643 for the case where third select signal sel2 is 1'b0 is shown as {SIMD{!mask_en}} (instead of a vector of 0s), such that when mask_en is 1, the input to the third mux 643 is {SIMD{1'b0}} (a vector of 0s) and when mask_en is 0 (mask disabled), the input to the third mux is {SIMD{1'b1}} (a vector of 1s).

Mask generation circuits in accordance with the examples described above with respect to FIG. 6A may also be adapted for use within the mask generation circuit 480 (e.g., without a mask enable signal), such as by fixing the input to the shifter 650 to {{(SIMD+1){1'b1}}, {(SIMD−1){1'b0}}} and fixing the input to the third mux 643 to a vector of 0s {SIMD{1'b0}}.

In addition, while FIG. 6A, FIG. 6B, and FIG. 6C describe one example of a mask generation circuit configured to generate an upper triangular mask, the present technology is not limited thereto.

For example, the example described above with respect to FIG. 6A, FIG. 6B, and FIG. 6C may be modified to generate a lower triangular mask through appropriate modifications to, for example, the fixed inputs supplied to the first mux 641 and the third mux 643 as well as to the 2*SIMD long vector supplied as input to the shifter 650. In some examples, this is controlled by an additional control signal supplied to the mask generation circuit 600. As a specific example, an upper_mask signal may be set to 1'b1 when an upper triangular mask is to be generated and may be set to 1'b0 when a lower triangular mask is to be generated. Accordingly, the fixed input to the first mux 641 in this example may be {SIMD {upper_mask}}||SIMD {!mask_en} instead of {SIMD{1'b}} and the fixed input to the third mux 643 may be {SIMD{!upper_mask}}|SIMD{!mask_en}. The vector input to the shifter 650 may similarly be modified to: {{(SIMD−1){upper_mask}}, {(2){1'b1}},{(SIMD−1){!upper_mask}}}||{(2*SIMD) {!mask_en}}.

In some examples, the mask generation circuit is configured to output a block triangular mask, where the mask is aligned with the SIMD chunks of each row and there is no case where the mask generation circuit generates a chunk that is a mix of 1s and 0s. This approach may simplify the mask generation circuit, such as through the omission of the equal comparator 630, the shifter 650, and the second mux 642 because chunks having a mix of 1s and 0s no longer need to be generated for a block triangular mask. The block triangular mask may be generated in upper triangular or lower triangular patterns, in a manner similar to that described above.

In some examples of mask generation circuits according to the present technology, the mask generation circuit 600 is further configurable based on mask parameters as shown in FIG. 4A and FIG. 5A. For example, the mask parameters may be supplied to control pins of one or more additional multiplexers to select between different configured mask patterns within the mask generation circuit, such as to enable or disable the circuit elements used to generate a triangular mask versus a block triangular mask, or to select an entirely different mask generation circuit (e.g., to generate a mask pattern based on a parity of the row_cnt and/or col_cnt coordinates or index).

In some additional examples of mask generation circuits according to the present technology, the underlying pattern generated by the mask may be parameterized based on the mask parameters, such as where the mask parameters specify the indices or coordinates corresponding to corners of a rectangular region to be masked (or defining a region that is not masked), such as where the length of each step of a block triangular mask (in units of SIMD) is controlled based on a parameter.

Figure 7:
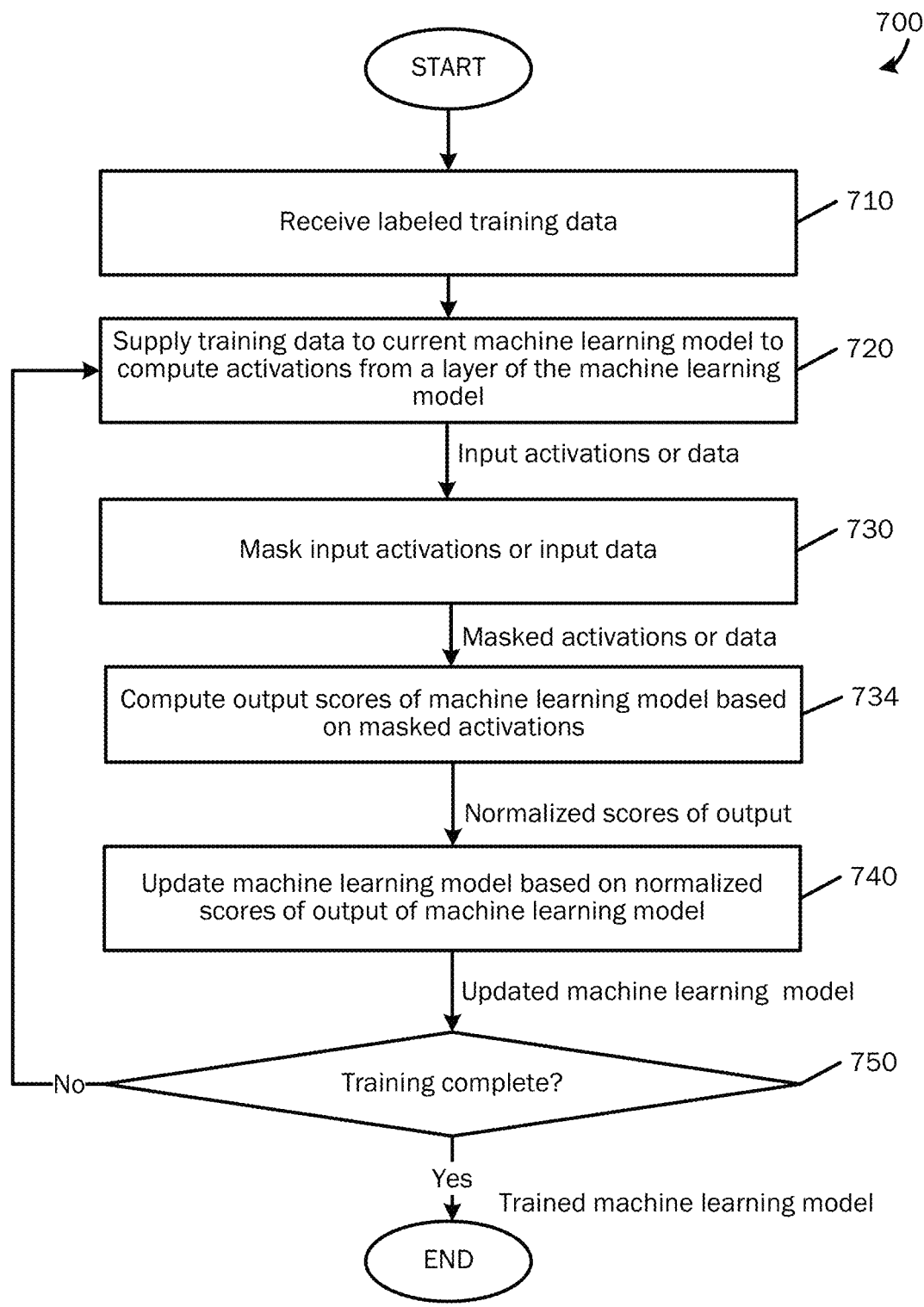
FIG. 7 is a flowchart depicting a method for training a machine learning model, such as a transformer model, using an accelerated data masking circuit according to one example of the present disclosure.
Figure 8:
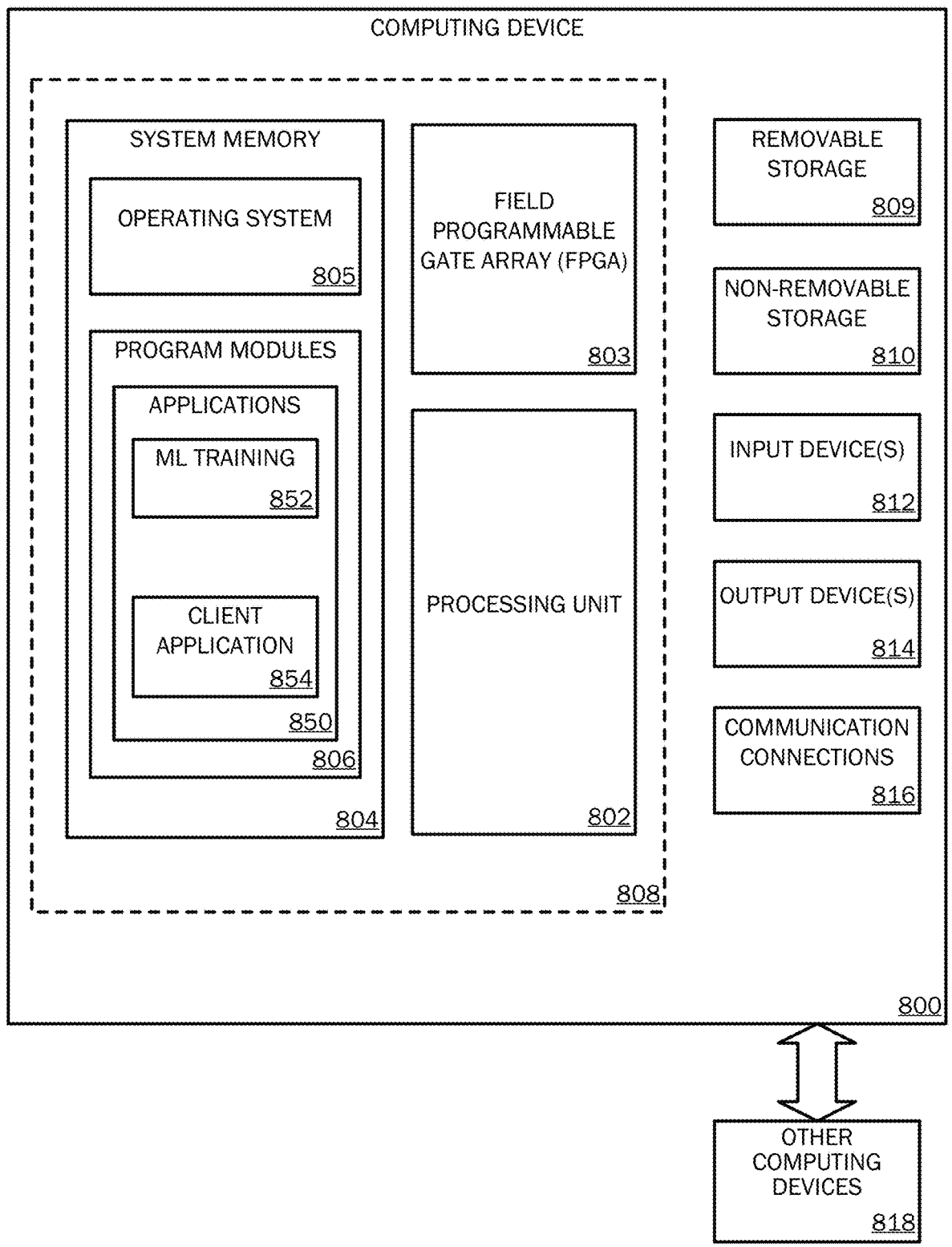
FIG. 8 is a block diagram illustrating example physical components of a computing device with which aspects of the invention may be practiced.

FIG. 7 is a flowchart depicting a method for training a machine learning model, such as a transformer model, using an accelerated data masking circuit according to one example of the present disclosure. In the example shown in FIG. 7, a machine learning model training application (see, e.g., machine learning training application 852 running on a computing device including an FPGA, as shown in FIG. 8) performs a supervised learning algorithm to train a machine learning model, such as a transformer model, based on a collection of labeled input data. In the example shown in FIG. 7, the machine learning model training application receives labeled training data in operation 710, and supplies the training data (e.g., a batch of training data) to a current machine learning model to compute activations (e.g., supplies an input vector of values from a data sample of the training data to a deep neural network, where a layer of the deep neural network generates activations).

In operation 730, the machine learning model training application masks the input activations or training example data. This may include applying a mask to the training example data, whether an external mask received from a system memory or an internal mask generated on the accelerator, to compute masked data in accordance with the techniques described above with respect to FIGS. 1, 2, 3A, 3B, 4A, 4B, 5A, 5B, 6A, 6B, and 6C, such as by applying methods 390, 490, or 590 .... In operation 734, the machine learning model training application computes output scores of the machine learning model based on the masked activations or data (e.g., because masked activations calculated using the hardware accelerated computations of the masking of the data were used in the forward propagation of data through the machine learning model). The normalized output scores may be computed using, for example, a SoftMax function to normalize the activations generated by an output layer of the deep neural network or transformer model.

In operation 740, the machine learning model training application updates the machine learning model based on normalized scores of the output of the machine learning model (where the output is computed based on activations computed in hidden layers or the output layer of the deep neural network using techniques in accordance with the present technology) to generated an updated machine learning model (e.g., in a deep neural network, by comparing the normalized scores with the labels of the training data and updating the weights of the connections between neurons through gradient descent and backpropagation). In operation 750, the machine learning model training application determines whether training is complete (e.g., whether a maximum number of training intervals or training epochs has been completed or if the performance of the machine learning model has converged), and if not, then the training process may continue by returning to operation 720 using the updated machine learning model. If the training process is complete, then the updated machine learning model is output as a trained machine learning model and stored and the training process ends. The stored, trained machine learning model may then be deployed for use in performing inference tasks (e.g., making predictions or estimates) based on live data similar to the training data (e.g., natural language input data, images, etc.) by processing the live data with the trained machine learning model to generate an output (e.g., a classification of the input live data or a predicted next item in a sequence).

Aspects of the present technology also relate to a zero-operation masking method without using any floating-point operations. Generally, the purpose of an attention mask in a transformer model is to assign a large negative values to the masked-out locations so that the following SoftMax layer in the machine learning model attenuates the masked-out locations to zero when supplied as input to a low-precision exponential function (exp(x)) of the SoftMax layer. In most transformer models (e.g., Bidirectional Encoder Representations from Transformer or BERT, see Devlin, Jacob, et al. "Bert: Pre-training of deep bidirectional transformers for language understanding." arXiv preprint arXiv: 1810.04805 (2018).)−10000.0 is used as the masked output value.

As noted above, instead of doing a vector subtraction of −10000.0 when the mask bit is 0, followed by a floating-point vector multiplication, directly using a 2-to-1 mux with one constant input of −10000.0 performs the same function: y=mask ? x: −10000.0 (where ? is the ternary if or conditional operator). In other words, when using low precision floating point representations such as BFloat16, exp(x−10000)=exp(−10000.0)=0.

As such, aspects of the present technology enable a multiplexer to perform the same function that was previously performed by one floating-point multiplier and two adders, thereby significantly reducing hardware resource requirements (e.g., fewer logic blocks in an FPGA). For example, when using BFloat16 and SIMD=16, a comparative masking operation logic using two adders and a floating-point multiplier requires 1344 logic block (ALMs) and 11 DSPs. In contrast, an example of the present technology also using BFloat16 and SIMD=16 requires only needs 128 ALMs, which corresponds to a 91% ALM savings and 100% DSP saving. Furthermore, appropriately relocating the masking logic inside the accelerator (e.g., implementing a mask generation circuit inside the accelerator) can further reduce the 128 ALMs by packing the 2-to-1 muxes with other muxes that do not fully utilize the ALM (e.g., each ALM may support 1 8-to-1 lookup or 2 4-to-1 lookup). In one example implementation, a triangular mask generation circuit implemented on an FPGA with SIMD=16 consumed only 44 ALMs, which is substantially negligible in view of the overall system budget for implementing a machine learning accelerator on the FPGA (e.g., implementing additional circuits for accelerating machine learning, such as an accelerated SoftMax function).

Accordingly, aspects of the present technology provide systems and methods for accelerating the masking of data within a machine learning architecture, increasing the performance of training machine learning models, such as by reducing overall computation (training) time, reducing bandwidth and storage requirements, and/or reducing energy consumption.

Figure 9A:
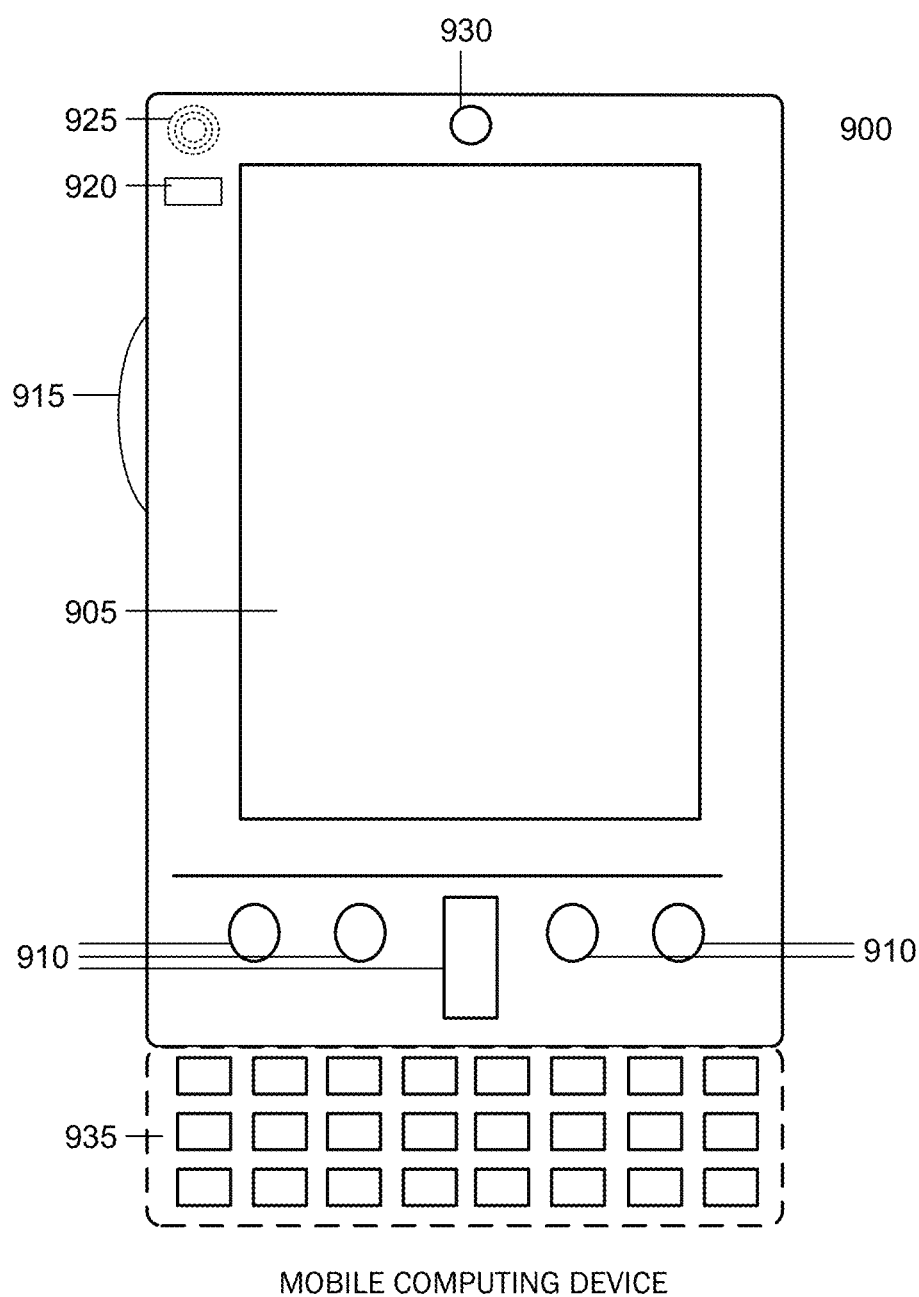
FIGS. 9A and 9B are simplified block diagrams of a mobile computing device with which aspects of the present invention may be practiced.
Figure 9B:
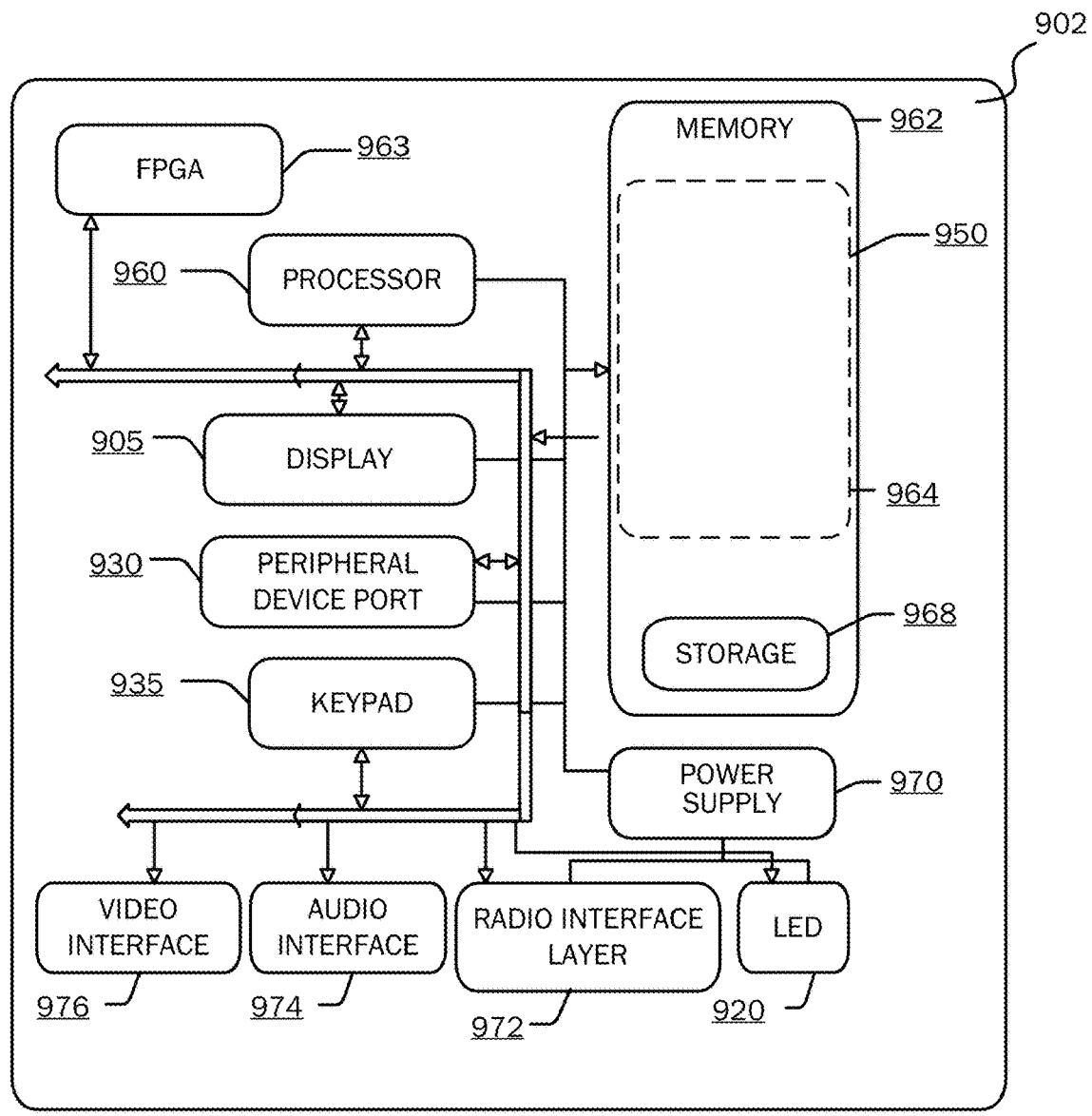

FIGS. 8, 9A, and 9B the associated descriptions provide a discussion of a variety of operating environments in which examples of the present technology may be practiced. However, the devices and systems illustrated and discussed with respect to FIGS. 8, 9A, and 9B are for purposes of example and illustration and are not limiting of a vast number of computing device configurations that may be utilized for practicing aspects of the invention, described herein.

FIG. 8 is a block diagram illustrating physical components (i.e., hardware) of a computing device 800 with which examples of the present disclosure may be practiced. The computing device components described below may be suitable for running a training process for a machine learning model or for performing inference using a trained machine learning model, as described above. In a basic configuration, the computing device 800 may include at least one processing unit 802, a field programmable gate array (FPGA) 803, and a system memory 804. In some examples, the processing unit 802 includes an FPGA 803 (e.g., the processing unit 802 may include an array of logic blocks that are reconfigurable through setting the interconnections). In some examples, the processing unit 802 is integrated or embedded into the FPGA 803 (e.g., in the case where one or more embedded "hard IP" CPU cores are connected directly to the interconnections or fabric of the FPGA 803 and/or one or more embedded "soft IP" CPU cores implemented using logic blocks of the FPGA 803). Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running software applications 850 such as a machine learning model training application 852 or a client application 854. The operating system 805, for example, may be suitable for controlling the operation of the computing device 800. Furthermore, aspects of the invention may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 may perform processes that offload computational tasks to the FPGA 803. The FPGA 803 may include data paths configured to accelerate the computation of various mathematical functions including, but not limited to, masking data as described above with respect to FIGS. 1, 2, 3A, 3B, 4A, 4B, 5A, 5B, 6A, 6B, and 6C. The FPGA 803 may be configured to include other data paths for implementing other mathematical functions in accordance with examples of the present invention, such as computing a softmax function, an exponential function, a reciprocal square root function, and the like.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 8 may be integrated onto a single integrated circuit. Such an SOC device may include one or more processing units, field programmable gate arrays, graphics units, communications units, system virtualization units and various application functionality all of which are integrated (or "burned") onto the chip substrate as a single integrated circuit. When operating via an SOC, some functionality, described herein, with respect to training a machine learning model (e.g., a deep neural network) or performing a calculation involving the masking of data, may be operated via application-specific logic integrated with other components of the computing device 800 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a general purpose computer or in any other circuits or systems.

The computing device 800 may also have one or more input device(s) 812 such as a keyboard, a mouse, a pen, a sound input device, a touch input device, etc. The output device(s) 814 such as a display, speakers, a printer, etc. may also be included. The aforementioned devices are examples and others may be used. In cases where the computing device 800 is a server, such user input devices and user output devices are typically not present or not directly connected to the computing device 800. The computing device 800 may include one or more communication connections 816 allowing communications with other computing devices 818. Examples of suitable communication connections 816 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, program modules, or configuration files ("bit files") specifying the configuration of an FPGA to implement particular functionality. The system memory 804, the removable storage device 809, and the non-removable storage device 810 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects of the invention may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative examples, mobile computing device 900 may incorporate more or less input elements. For example, the display 905 may not be a touch screen in some examples. In alternative examples, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 can incorporate a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone. As shown in FIG. 9B, the system 902 further includes a processor 960, a memory 962 storing an operating system 964 that may be executed by the processor 960. The system 902 may further include an FPGA 963, which may be configured (using a configuration file or bit file) to implement data paths for accelerating mathematical operations, such as data paths to mask input data as described above according to various examples of the present disclosure.

One or more application programs 950 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, machine learning software (e.g., for retraining models and/or federated machine learning) and so forth. The system 902 also includes a non-volatile storage area 968 within the memory 962. The non-volatile storage area 968 may be used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

The system 902 has a power supply 970, which may be implemented as one or more batteries. The power supply 970 might further include an external power source, such as an AC adapter or a powered docking cradle that supplements or recharges the batteries.

The system 902 may also include a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

The visual indicator 920 may be used to provide visual notifications and/or an audio interface 974 may be used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

As will be understood from the foregoing disclosure, one aspect of the technology relates to a field programmable gate array (FPGA) including a configurable interconnect fabric connecting a plurality of logic blocks, the configurable interconnect fabric and the logic blocks being configured to implement a data masking circuit configured to: receive input data including data values at a plurality of indices of the input data; select between a data value of the data values and an alternative value using a masking multiplexer to generate masked data, the masking multiplexer being controlled by a mask value of a plurality of mask values at indices corresponding to the indices of the input data; and output the masked data.

In an example, configurable interconnect fabric and the logic blocks are further configured to implement a mask generation circuit configured to generate the mask values based on corresponding indices of the input data.

In another example, the configurable interconnect fabric and the logic blocks are further configured to implement a mask selection multiplexer configured to output the mask values to control the masking multiplexer, wherein the mask selection multiplexer is configured to output, based on a mask selection input, to the masking multiplexer: the mask values received from the mask generation circuit; or external mask data stored in a device memory of the FPGA.

The mask generation circuit may be configured, in some examples, to generate the mask values in accordance with a triangular mask pattern. In some examples, the mask generation circuit is configured to generate the mask values in accordance a mask pattern selected from at least one of: an upper triangular mask; a lower triangular mask; a block upper triangular mask; a block lower triangular mask; or an alternating mask.

The mask generation circuit may be configured, in some examples, to receive one or more mask parameters, and the mask generation circuit is configured to select the mask pattern based on the one or mask parameters.

In some examples, the configurable interconnect fabric and the logic blocks of the data masking circuit are further configured to supply the masked data to a SoftMax function, wherein the data values and the alternative value are in a floating-point data format, and wherein the alternative value is a large negative number sufficiently large such that a result of supplying the large negative number to the SoftMax function rounds to zero in the floating-point data format.

In some examples of the present technology, the FPGA is connected to a computer system configured to train a machine learning model based on a plurality of training data, and the data masking circuit is configured to mask the training data supplied as the input data to the data masking circuit to accelerate training the machine learning model.

In an aspect, the present technology relates to computer storage media storing a configuration file, the configuration file specifying a configuration of a field programmable gate array (FPGA) including a configurable interconnect fabric and a plurality of logic blocks, where an FPGA configured based on the configuration file includes logic blocks, connected by the configurable interconnect fabric, implementing a data masking circuit configured to: receive input data including data values at a plurality of indices of the input data; select between a data value of the data values and an alternative value using a masking multiplexer to generate masked data, the masking multiplexer being controlled by a mask value of a plurality of mask values at indices corresponding to the indices of the input data; and output the masked data.

In one example, the configuration file further specifies the configuration of the configurable interconnect fabric and the logic blocks of the FPGA to implement a mask generation circuit configured to generate the mask values based on corresponding indices of the input data.

In some examples, the configuration file further specifies the configuration of the configurable interconnect fabric and the logic blocks of the FPGA to implement a mask selection multiplexer configured to output the mask values to control the masking multiplexer, wherein the mask selection multiplexer is configured to, based on a mask selection input, output: the mask values received from the mask generation circuit; or external mask data stored in a device memory of the FPGA.

The configuration file further specifies, in some examples, the configuration of the configurable interconnect fabric and the logic blocks of the FPGA to configure the mask generation circuit to generate the mask values in accordance with a triangular mask pattern.

In some examples, the configuration file further specifies the configuration of the configurable interconnect fabric and the logic blocks of the FPGA to configure the mask generation circuit to generate the mask values in accordance a mask pattern selected from at least one of: an upper triangular mask; a lower triangular mask; a block upper triangular mask; a block lower triangular mask; or an alternating mask.

The configuration file further specifies, in some examples, the configuration of the configurable interconnect fabric and the logic blocks of the FPGA to configure the mask generation circuit to receive one or more mask parameters and to mask generation circuit select the mask pattern based on the one or mask parameters.

The computer storage media of claim 9, wherein the configuration file further specifies the configuration of the configurable interconnect fabric and the logic blocks of the FPGA to configure the data masking circuit to supply the masked data to a SoftMax function, wherein the data values and the alternative value are in a floating-point data format, and wherein the alternative value is a large negative number sufficiently large such that a result of supplying the large negative number to the SoftMax function rounds to zero in the floating-point data format.

In an aspect, the present technology relates to a method for accelerating computations in a field programmable gate array (FPGA) including a configurable interconnect fabric connecting a plurality of logic blocks, the method including: receiving, at a data masking circuit implemented in the logic blocks and configurable interconnect fabric of the FPGA, input data including data values at a plurality of indices of the input data; selecting, by a masking multiplexer of the data masking circuit, between a data value of the data values and an alternative value to generate masked data, the masking multiplexer being controlled by a mask value of a plurality of mask values at indices corresponding to the indices of the input data; and outputting the masked data.

In one example, the configurable interconnect fabric and the logic blocks are further configured to implement a mask generation circuit, the method further including: generating the mask values within the mask generation circuit of the FPGA based on corresponding indices of the input data.

In some examples, the configurable interconnect fabric and the logic blocks are further configured to implement a mask selection multiplexer configured to output the mask values to control the masking multiplexer, wherein the method further includes outputting, by the mask selection multiplexer, based on a mask selection input, to the masking multiplexer: the mask values received from the mask generation circuit; or external mask data stored in a device memory of the FPGA.

The configurable interconnect fabric and the logic blocks are further configured, in some examples, to supply the masked data from the data masking circuit to a SoftMax function, wherein the data values and the alternative value are in a floating-point data format, and wherein the alternative value is a large negative number sufficiently large such that a result of supplying the large negative number to the SoftMax function rounds to zero in the floating-point data format.

In some examples, the method further includes training a machine learning model, including receiving, by a machine learning model training application executed by a computing device including a processor, memory, and the FPGA, labeled training data; supplying, by the machine learning model training application, the labeled training data to the machine learning model to generate input data; supplying, by the machine learning model training application, the input data to a data masking circuit implemented in the FPGA to generate masked data; computing a plurality of output scores of the machine learning model based on the masked data computed by the machine learning model in response to the labeled training data; updating the machine learning model based on the output scores; and outputting the updated machine learning model as a trained machine learning model.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way.

The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. An electronic circuit comprising a data masking circuit to:
   receive input data including a two-dimensional array of data values at a plurality of indices of the two-dimensional array of the input data;
   select between a data value of the data values and an alternative value using a masking multiplexer to generate masked data, the masking multiplexer being controlled by a mask value of a plurality of mask values at indices corresponding to the indices of the input data; and
   output the masked data.

2. The electronic circuit of claim 1, further comprising a mask generation circuit configured to generate the plurality of mask values based on corresponding indices of the input data.

3. The electronic circuit of claim 1, wherein the masked data is supplied to a SoftMax function,
   wherein the data values and the alternative value are in a floating-point data format, and
   wherein the alternative value is a large negative number sufficiently large such that a result of supplying the large negative number to the SoftMax function rounds to zero in the floating-point data format.

4. The electronic circuit of claim 1, wherein the electronic circuit is connected to a computer system configured to train a machine learning model based on a plurality of training data, and
   wherein the data masking circuit is configured to mask the training data supplied as the input data to the data masking circuit to accelerate training the machine learning model.

5. The electronic circuit of claim 2, further comprising a mask selection multiplexer to output the plurality of mask values to control the masking multiplexer,
   wherein the mask selection multiplexer is configured to output, based on a mask selection input, to the masking multiplexer:
      the plurality of mask values received from the mask generation circuit; or
      external mask data stored in a device memory of the electronic circuit.

6. The electronic circuit of claim 2, wherein the mask generation circuit is configured to generate the plurality of mask values in accordance with a triangular mask pattern.

7. The electronic circuit of claim 2, wherein the mask generation circuit is configured to generate the plurality of mask values in accordance a mask pattern selected from at least one of:
   an upper triangular mask;
   a lower triangular mask;
   a block upper triangular mask;
   a block lower triangular mask; or
   an alternating mask.

8. The electronic circuit of claim 7, wherein the mask generation circuit is configured to receive one or more mask parameters, and
   wherein the mask generation circuit is configured to select the mask pattern based on the one or mask parameters.

9. Computer storage media storing a configuration file, the configuration file specifying an accelerator electronic circuit comprising a data masking circuit configured to:
   receive input data comprising a two-dimensional array including data values at a plurality of indices of the two-dimensional array of the input data;
   select between a data value of the data values and an alternative value using a masking multiplexer to generate masked data, the masking multiplexer being controlled by a mask value of a plurality of mask values at indices corresponding to the indices of the input data; and
   output the masked data.

10. The computer storage media of claim 9, wherein the configuration file further specifies a mask generation circuit configured to generate the plurality of mask values based on corresponding indices of the input data.

11. The computer storage media of claim 9, wherein the configuration file further configures the data masking circuit to supply the masked data to a SoftMax function,
   wherein the data values and the alternative value are in a floating-point data format, and
   wherein the alternative value is a large negative number sufficiently large such that a result of supplying the large negative number to the SoftMax function rounds to zero in the floating-point data format.

12. The computer storage media of claim 10, wherein the configuration file further specifies a mask selection multiplexer configured to output the plurality of mask values to control the masking multiplexer,
   wherein the mask selection multiplexer is configured to, based on a mask selection input, output:
      the plurality of mask values received from the mask generation circuit; or
      external mask data stored in a device memory of the accelerator electronic circuit.

13. The computer storage media of claim 10, wherein the configuration file further configures the mask generation circuit to generate the plurality of mask values in accordance with a triangular mask pattern.

14. The computer storage media of claim 10, wherein the configuration file further configures the mask generation circuit to generate the plurality of mask values in accordance a mask pattern selected from at least one of:
   an upper triangular mask;
   a lower triangular mask;
   a block upper triangular mask;
   a block lower triangular mask; or
   an alternating mask.

15. The computer storage media of claim 14, wherein the configuration file further configures the mask generation circuit to receive one or more mask parameters and to select the mask pattern based on the one or mask parameters.

16. A method for accelerating computations, the method comprising:

receiving, by a machine learning model training application executed by a computing device comprising a processor, memory, and an accelerator electronic circuit, labeled training data;

supplying, by the machine learning model training application, the labeled training data to a machine learning model to generate input data;

supplying, by the machine learning model training application, the input data to a data masking circuit implemented in the accelerator electronic circuit to generate masked data;

receiving, at the data masking circuit of the accelerator electronic circuit, input data including data values at a plurality of indices of the input data;

selecting, by a masking multiplexer of the data masking circuit, between a data value of the data values and an alternative value to generate the masked data, the masking multiplexer being controlled by a mask value of a plurality of mask values at indices corresponding to the indices of the input data;

outputting the masked data;

computing a plurality of output scores of the machine learning model based on the masked data computed by the machine learning model in response to the labeled training data;

updating the machine learning model based on the output scores; and outputting the updated machine learning model as a trained machine learning model.

17. The method of claim 16, wherein the accelerator electronic circuit comprises a mask generation circuit, the method further comprising:

generating the plurality of mask values within the mask generation circuit of the accelerator electronic circuit based on corresponding indices of the input data.

18. The method of claim 17, wherein the accelerator electronic circuit comprises a mask selection multiplexer configured to output the plurality of mask values to control the masking multiplexer, wherein the method further comprises outputting, by the mask selection multiplexer, based on a mask selection input, to the masking multiplexer:

the plurality of mask values received from the mask generation circuit; or external mask data stored in a device memory of the accelerator electronic circuit.

19. The method of claim 17, further comprising supplying the masked data from the data masking circuit to a SoftMax function, wherein the data values and the alternative value are in a floating-point data format, and wherein the alternative value is a large negative number sufficiently large such that a result of supplying the large negative number to the SoftMax function rounds to zero in the floating-point data format.

* * * * *